(12) United States Patent
Zheng et al.

(10) Patent No.: US 12,214,487 B2
(45) Date of Patent: Feb. 4, 2025

(54) VISION-BASED TACTILE MEASUREMENT METHOD AND APPARATUS, CHIP, AND STORAGE MEDIUM

(71) Applicant: Tencent Technology (Shenzhen) Company Limited, Shenzhen (CN)

(72) Inventors: Yu Zheng, Shenzhen (CN); Zhongjin Xu, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 882 days.

(21) Appl. No.: 17/369,837

(22) Filed: Jul. 7, 2021

(65) Prior Publication Data

US 2021/0334584 A1 Oct. 28, 2021

Related U.S. Application Data

(63) Continuation of application No. PCT/CN2020/085608, filed on Apr. 20, 2020.

(30) Foreign Application Priority Data

May 16, 2019 (CN) .......................... 201910411693.6

(51) Int. Cl.
*B25J 13/08* (2006.01)
*G01B 5/20* (2006.01)
(Continued)

(52) U.S. Cl.
CPC .............. *B25J 13/084* (2013.01); *G01B 5/20* (2013.01); *G06F 18/21* (2023.01); *G06F 18/22* (2023.01);
(Continued)

(58) Field of Classification Search
CPC .. G06T 7/64; G06T 7/40; G06V 10/82; G06V 10/758; G06V 10/774; G06V 10/776;
(Continued)

(56) References Cited

U.S. PATENT DOCUMENTS

2011/0029470 A1 2/2011 Hartmann et al.
2022/0207864 A1* 6/2022 Autes et al. ........... G06V 10/82

FOREIGN PATENT DOCUMENTS

CN 1203142 A 12/1998
CN 1539604 A 10/2004
(Continued)

OTHER PUBLICATIONS

Sferrazza C, D'Andrea R. Design, motivation and evaluation of a full-resolution optical tactile sensor. Sensors. Feb. 22, 2019;19(4):928. (Year: 2019).*

(Continued)

*Primary Examiner* — David Perlman
(74) *Attorney, Agent, or Firm* — Morgan, Lewis & Bockius LLP

(57) ABSTRACT

A vision-based tactile measurement method is provided, performed by a computer device (e.g., a chip) connected to a tactile sensor, the tactile sensor including a sensing face and an image sensing component, and the sensing face being provided with a marking pattern. The method includes: obtaining an image sequence collected by the image sensing component of the sensing face, each image of the image sequence comprising one instance of the marking pattern; calculating a difference feature of the marking patterns in adjacent images of the image sequence; and processing the difference feature of the marking patterns using a feedforward neural network to obtain a tactile measurement result, a quantity of hidden layers in the feedforward neural network being less than a threshold.

20 Claims, 18 Drawing Sheets

---

201 — Obtain an image sequence collected by an image sensing component for a sensing face, an image of the image sequence including a marking pattern 202 — Calculate a difference feature of the marking patterns based on the marking patterns in adjacent images in the image sequence 203 — Call a feedforward neural network model to process the difference feature of the marking patterns to obtain a tactile measurement result

(51) Int. Cl.
| | |
|---|---|
| G06F 18/21 | (2023.01) |
| G06F 18/22 | (2023.01) |
| G06F 18/24 | (2023.01) |
| G06N 3/08 | (2023.01) |
| G06T 7/40 | (2017.01) |
| G06T 7/64 | (2017.01) |
| G06V 10/22 | (2022.01) |
| G06V 10/75 | (2022.01) |
| G06V 10/764 | (2022.01) |
| G06V 10/774 | (2022.01) |
| G06V 10/776 | (2022.01) |
| G06V 10/82 | (2022.01) |
| G06V 20/10 | (2022.01) |

(52) U.S. Cl.
CPC ............. *G06F 18/24* (2023.01); *G06N 3/08* (2013.01); *G06T 7/40* (2013.01); *G06T 7/64* (2017.01); *G06V 10/225* (2022.01); *G06V 10/758* (2022.01); *G06V 10/764* (2022.01); *G06V 10/774* (2022.01); *G06V 10/776* (2022.01); *G06V 10/82* (2022.01); *G06T 2207/20084* (2013.01); *G06V 20/10* (2022.01)

(58) Field of Classification Search
CPC .... G06V 10/764; G06V 10/225; G06F 18/22; G06F 18/24; G06F 18/21
See application file for complete search history.

(56) References Cited

FOREIGN PATENT DOCUMENTS

| | | |
|---|---|---|
| CN | 106092382 A | 11/2016 |
| CN | 106204620 A | 12/2016 |
| CN | 106650918 A | 5/2017 |
| CN | 107589830 A | 1/2018 |
| CN | 108229548 A | 6/2018 |
| CN | 109716361 A | 5/2019 |
| CN | 110162175 A | 8/2019 |
| WO | WO 2017209660 A1 | 12/2017 |

OTHER PUBLICATIONS

Wettels, N., & Loeb, G. E. (Dec. 2011). Haptic feature extraction from a biomimetic tactile sensor: force, contact location and curvature. In 2011 IEEE international conference on robotics and biomimetics (pp. 2471-2478). IEEE. (Year: 2011).*

Bin Fang et al., "A Dual-Modal Vision-Based Tactile Sensor for Robotic Hand Grasping", 2018 IEEE International Conference on Robotics and Automation (ICRA), May 21, 2018, ISSN: 2577-087X, 3 pgs., Retrieved from the Internet: https://ieeexplore.ieee.org/abstract/document/8461007.

Tencent Technology, ISR, PCT/CN2020/085608, Aug. 10, 2020, 3 pgs.

Tencent Technology, WO, PCT/CN2020/085608, Aug. 10, 2020, 7 pgs.

Tencent Technology, IPRP, PCT/CN2020/085608, Nov. 16, 2021, 8 pgs.

Bin Fang et al., "A Dual-Modal Vision-Based Tactile Sensor for Robotic Hand Grasping", 2018 IEEE International Conference on Robotics and Automation (ICRA), IEEE, Brisbane, Australia, May 21, 2018, XP033403444, 6 pgs.

Extended European Search Report, EP20804776.1, May 27, 2022, 8 pgs.

Katsunari Sato et al., "Finger-Shaped GelForce: Sensor for Measuring Surface Traction Fields for Robotic Hand", IEEE Transactions on Haptics, IEEE, USA, vol. 3, No. 1, Jan. 1, 2010, XP011327952, 11 pgs.

Wenzhen Yuan et al., "GelSight: High-Resolution Robot Tactile Sensors for Estimating Geometry and Force", Computer Science and Artificial Intelligence Laboratory (CSAIL), Massachusetts Institute of Technology, vol. 17, No. 12, Nov. 29, 2017, XP055921587, 21 pgs.

Yazhan Zhang et al., "FingerVision Tactile Sensor Design and Slip Detection Using Convolutional LSTM Network", arxiv.org, Olin Library, Cornell University, NY, Oct. 5, 2018, XP081057909, 7 pgs.

Tencent Technology, European Office Action, EP Patent Application No. 20804776.1, Dec. 5, 2023, 5 pgs.

* cited by examiner

Table of quantities of samples

| fz (N) | 1.5-2.5 | 2.5-3.5 | 3.5-4.5 | 4.5-5.5 | 5.5-6.5 | 6.5-8 |
|---|---|---|---|---|---|---|
| Tip | 100 | 75 | 75 | 75 | * | * |
| Plane | 100 | 100 | 100 | 100 | 100 | 100 |
| Others | 100 | 50 | 50 | 50 | 50 | 50 |

*Excessively deformed

VISION-BASED TACTILE MEASUREMENT METHOD AND APPARATUS, CHIP, AND STORAGE MEDIUM

CROSS-REFERENCE TO RELATED APPLICATIONS

This application is a continuation application of PCT Patent Application No. PCT/CN2020/085608, entitled "VISION-BASED TACTILE MEASUREMENT METHOD, APPARATUS, CHIP AND STORAGE MEDIUM" filed on Apr. 20, 2020, which claims priority to Chinese Patent Application No. 201910411693.6, filed with the State Intellectual Property Office of the People's Republic of China on May 16, 2019, and entitled "VISION-BASED TACTILE MEASUREMENT METHOD AND APPARATUS, CHIP, AND STORAGE MEDIUM", all of which are incorporated herein by reference in their entirety.

FIELD OF THE TECHNOLOGY

This application relates to the field of human-machine interaction, and in particular, to a vision-based tactile measurement method and apparatus, a chip, and a storage medium.

BACKGROUND OF THE DISCLOSURE

A tactile sensor is a sensor configured to imitate a tactile function, and can perform tactile measurement, such as a contact location and a contact force, on a contact object. Currently, tactile sensors are mostly used in the field of robots.

A tactile sensor is provided in the related art. The tactile sensor is provided with a semicircular flexible sensing face. An inner surface of the flexible sensing face is provided with a plurality of marking points arranged in an array, and an image sensing component provided toward the inner surface. After an outer surface of the flexible sensing face comes into contact with an object, the flexible sensing face is deformed, which causes the plurality of marking points on the inner surface to change locations due to the deformation. The image sensing component collects an image of the inner surface of the flexible sensing face, and transmits the image of the inner surface to a chip. The chip is provided with a convolutional neural network (CNN), and the image of the inner surface is processed through the CNN to obtain an analysis result of a contact force.

A training process of the foregoing CNN is relatively complex and up to 20,000 training samples are required to achieve a good training effect.

SUMMARY

Embodiments of this application provide a vision-based tactile measurement method and apparatus, a chip, and a storage medium, a method and an apparatus for training a feedforward neural network, a computer device, and a storage medium, a tactile sensor system, and a robot system.

A vision-based tactile measurement method is provided, the method is performed by a computer device (e.g., a chip) connected to a tactile sensor, the tactile sensor includes a sensing face and an image sensing component, and the sensing face is provided with a marking pattern; and the method includes: obtaining an image sequence collected by the image sensing component of the sensing face, each image of the image sequence comprising one instance of the marking pattern; calculating a difference feature of the marking patterns in adjacent images of the image sequence; and processing the difference feature of the marking patterns using a feedforward neural network to obtain a tactile measurement result, a quantity of hidden layers in the feedforward neural network being less than a threshold.

A computer device in connection with a tactile sensor, the tactile sensor comprising a sensing face and an image sensing component, and the sensing face being provided with a marking pattern, is provided, the computer device including a memory and a processor, where the memory stores a plurality of computer-readable instructions, and when the processor executes the computer-readable instructions, operations of the aforementioned vision-based tactile measurement method are implemented.

A non-transitory computer-readable storage medium, storing a plurality of computer-readable instructions, where the computer-readable instructions, when executed by a processor of a computer device in connection with a tactile sensor, the tactile sensor comprising a sensing face and an image sensing component, and the sensing face being provided with a marking pattern, cause the computer device to perform the aforementioned vision-based tactile measurement method.

A robot system is provided, including: a chip and a tactile sensor, where the tactile sensor is provided in at least one of a fingertip zone and a skin zone, the tactile sensor includes a sensing face and an image sensing component, the sensing face is provided with a marking pattern, and the image sensing component is connected to the chip; and the chip includes at least one of a programmable logic circuit and a program instruction, and when the chip runs, the chip is configured to perform the vision-based tactile measurement method in the foregoing aspects.

Details of one or more embodiments of this application are provided in the subsequent accompanying drawings and descriptions. Other features, objectives, and advantages of this application are illustrated in the specification, the accompanying drawings, and the claims.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following describes embodiments of this application in more detail with reference to the accompanying drawings. Although some embodiments of this application are shown in the accompanying drawings, it is to be understood that this application can be implemented in various forms and is not to be construed as being limited to the embodiments illustrated herein. On the contrary, these embodiments are provided to help more thoroughly and completely understand this application. It is to be understood that the accompanying drawings and the embodiments of this application are only used as examples, and are not intended to limit the protection scope of this application.

The term "include" and its variants used herein mean open-ended inclusion, that is, "including but not limited to". The term "based on" is "based at least in part on". The term "an embodiment" indicates "at least one embodiment", the term "another embodiment" indicates "at least one additional embodiment". Related definitions of other terms are described below.

First, several terms provided in the embodiments of this application are briefly introduced.

Feedforward neural network model: an artificial neural network with a unidirectional structure. The feedforward neural network includes at least two neural network layers. Each neural network layer includes several neurons, and the neurons are arranged in layers. There is no interconnection between neurons in the same layer, and information is only unidirectionally transmitted between layers.

Logistic (Sigmoid) function: an S-shaped function used to describe a growth trend that the function increases roughly exponentially at an initial stage, then becomes saturated with an increase rate slowing down, and finally, becomes mature and stops increasing.

Normalized exponential (Softmax) function: a function that can "compress" a vector including any real number into another real vector, so that each element ranges within (0,1), and a sum of all elements is 1.

Hidden layer: a neural network layer structure used to input or analyze data.

Output layer: a neural network layer structure used to output a result.

Figure 1:
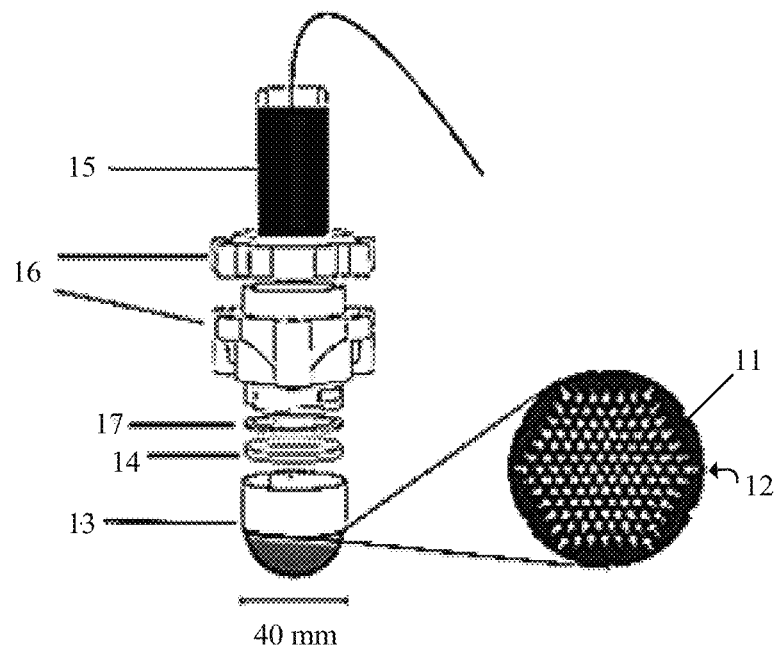
FIG. 1 is a schematic structural diagram of a tactile sensor in the related art according to an exemplary embodiment of this application.

As shown in FIG. 1, a tactile sensor is provided in the related art. The tactile sensor includes: a silicone sensing face 11; a marking point 12 provided on an inner surface of the silicone sensing face 11; a model front end 13 of the tactile sensor that is produced through a 3D printing technology, where the model front end 13 is configured to fix the silicone sensing face 11; a lens 14; an image sensing component 15; a model rear end 16 of the tactile sensor that is configured to fix the image sensing component; and a ring 17 formed by a light emitting diode (LED). In this technology, a probabilistic model based on the Bayesian theorem is used to identify a location of a contact point, and a curvature radius and an orientation of a contact edge, and an algorithm of a CNN model is used in the latest research to achieve the foregoing test results. However, because the probabilistic model based on the Bayesian theorem is not a continuous estimation algorithm, this technology can only be used to discontinuously identify the curvature radius of the contact object, for example, only 20 mm or 30 mm can be identified. In addition, the algorithm of the CNN model causes a problem of a large quantity of training samples. For example, more than 20,000 sample images are required to achieve a good model effect after training.

In some embodiments provided in this application, a vision-based tactile measurement method is provided by using a feedforward neural network. In the method, displacement of marking points on two consecutive images in an image array is used as a feature value to be inputted into the feedforward neural network, to obtain information such as a location of a contact point, a magnitude and/or a direction of a contact force, and a curvature radius of a contact surface. Compared with the CNN model used in the related art, the method simplifies the inputted feature value (only the displacement and/or deformation of the marking points is required instead of the entire image). In addition, a quantity of training samples is significantly reduced, and a training efficiency of the neural network is improved, thereby meeting a requirement of simplifying a method for using a tactile sensor, and achieving the same (or better) effect by using the feedforward neural network without requiring training of a large quantity of samples.

In some embodiments provided in this application, the vision-based tactile measurement method is applicable to a chip 117, and the chip 117 may be any one of a CPU, a GPU, a neural network chip, a microprocessor, or an FPGA circuit. This is no limited here. The chip 117 is connected to a tactile sensor. The tactile sensor includes a sensing face 111 and an image sensing component 115. The sensing face 111 is provided with a marking pattern 112. Optionally, the sensing face 111 is a flexible sensing face and can be deformed when coming into contact with another object. The image sensing component 115 may be a camera. The camera may be provided toward an inner surface of the sensing face 111.

Figure 2:
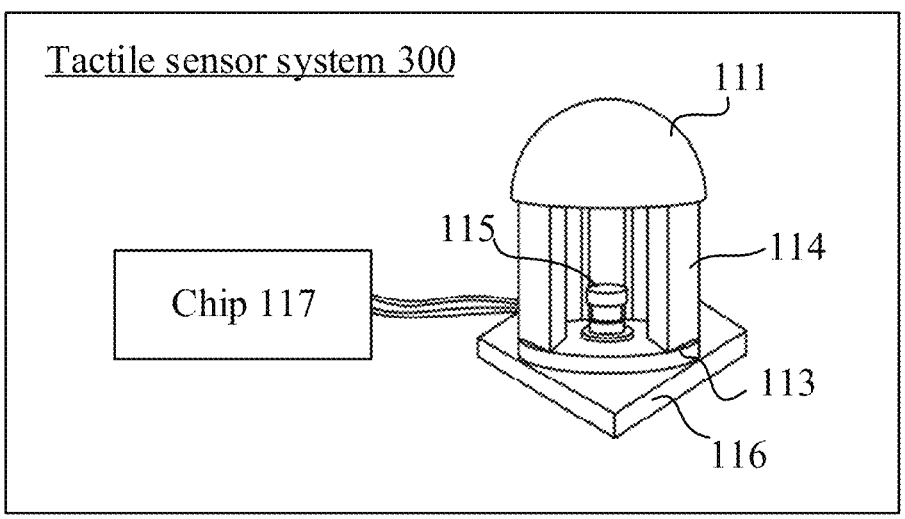
FIG. 2 is a schematic structural diagram of a tactile sensor system according to an exemplary embodiment of this application.

FIG. 2 is a schematic structural diagram of a tactile sensor system 300 according to an exemplary embodiment of this application. The tactile sensor includes a sensing face 111, a base 113, a pillar 114, and an image sensing component 115 provided toward an inner surface of the sensing face 111, and a bottom plate 116 is configured to place the tactile sensor.

Figure 3:
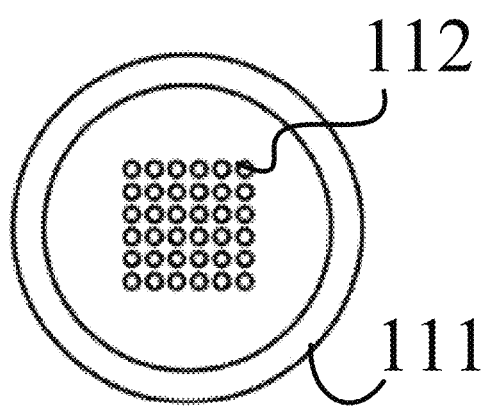
FIG. 3 is a schematic diagram of a flexible sensing face according to an exemplary embodiment of this application.

FIG. 3 is a schematic diagram of an inner surface of the sensing face 111 according to an exemplary embodiment of this application. A marking pattern 112 is provided on the inner surface of the sensing face 111.

In some embodiments, a shape of the sensing face 111 is not limited. The sensing face 111 may be any one of shapes such as a rectangle, a hexagon, a circle, an ellipse, a hemisphere, or a flat surface. As shown in FIG. 3, in an example of this embodiment, a hemispherical flexible sensing face 111 is used as an example for description.

In some embodiments, the marking pattern is implemented by using at least two marking points, a grid, or both the marking points and the grid. The grid is a pattern with intersecting grid lines, and grid points are formed on the intersecting grid lines.

The marking pattern implemented by using the marking points is used as an example. Marking points 112 are provided on (or inside) an inner surface of the sensing face 111. The marking points 112 may form an array arrangement or a non-array arrangement, for example, a 4×4 or 6×6 rectangular array, or a circular non-array arrangement. There is at least one array on the inner surface of the sensing face 111. For example, two arrays are provided on the sensing face 111. A larger quantity of arrays can reflect more deformation, and the amount of calculation also increases.

Distances between adjacent marking points 112 may be equal or not equal. When the distances between the adjacent marking points 112 are equal, displacement of the marking points 112 changes evenly. The marking points 112 may be provided at a center of the inner surface of the sensing face 111. For example, marking points 112 of a 4×4 rectangular array are provided on the sensing face 111. Alternatively, the marking points 112 may be provided along an edge of the sensing face 111. A color of the marking point may be any color. In this application, a black marking point 112 is selected to be distinguished from a white sensing face 111, to better indicate the displacement of the marking point 112.

In some embodiments, an array of black marking points 112 is arranged at the center of the inner surface of the sensing face 111, and distances between the marking points 112 on an edge of the array of marking points and edges of the sensing face 111 are equal, and distances between adjacent marking points 112 are equal. For another example, as shown in FIG. 3, a circular sensing face 111 and a rectangular array of 6×6 marking points 112 are used as an example for description.

This embodiment of this application imposes no limitation on a specific implementation form of the marking pattern 112.

Figure 4:
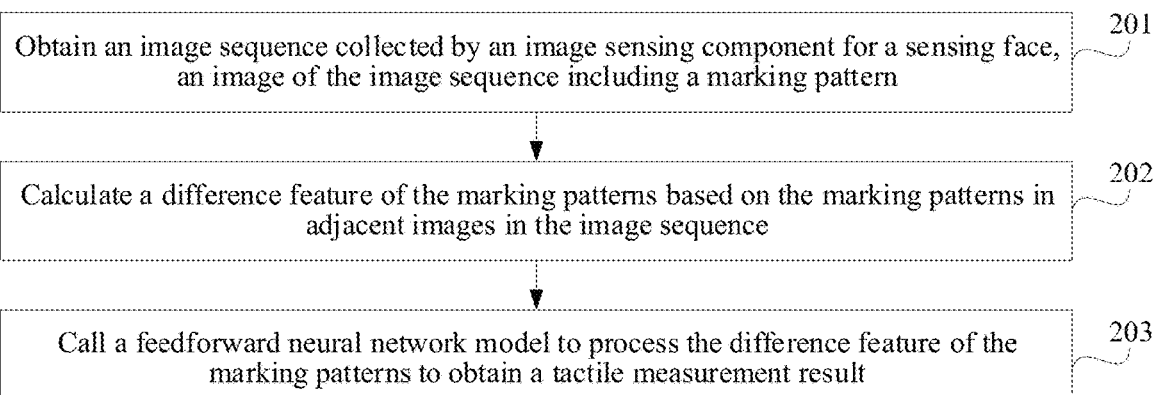
FIG. 4 is a flowchart of a usage method of a tactile sensor according to an exemplary embodiment of this application.

FIG. 4 is a flowchart of a vision-based tactile measurement method according to an exemplary embodiment of this application. The method may be performed by the chip 117 in FIG. 1, and the method includes the following steps.

Step 201: Obtain an image sequence collected by an image sensing component of an inner surface, each image of the image sequence including a marking pattern.

When a to-be-contacted object comes into contact with the sensing face 111 of a tactile sensor, the sensing face 111 is deformed, and the image sensing component continuously shoots the inner surface of the sensing face 111 at a specific frequency and transmits images to the chip, thereby forming an image array.

The marking pattern including marking points is used as an example. The frequency may be set according to displacement of the marking points 112, such as 30 frames/second or 60 frames/second. In addition, in a high-frequency shooting state of the image sensing component 115, the tactile sensor can also detect slippage of the contacted object, and can even detect a large sudden force.

Step 202. Calculate a difference feature of the marking patterns based on the marking patterns in adjacent images of the image sequence.

In some embodiments, the adjacent images in the image array are two adjacent images.

When the marking pattern includes the marking points, the difference feature of the marking patterns includes at least one of displacement and deformation of the marking points. For example, the difference feature of the marking patterns includes the displacement of the marking points. For another example, the difference feature of the marking patterns includes the displacement and deformation of the marking points.

When the marking pattern includes a grid, the difference feature of the marking patterns includes at least one of displacement of grid points and deformation of grid lines in the grid. For example, the difference feature of the marking patterns includes the displacement of the grid points in the grid. For another example, the difference feature of the marking patterns includes the displacement of the grid points and the deformation of the grid lines in the grid.

Figure 5:
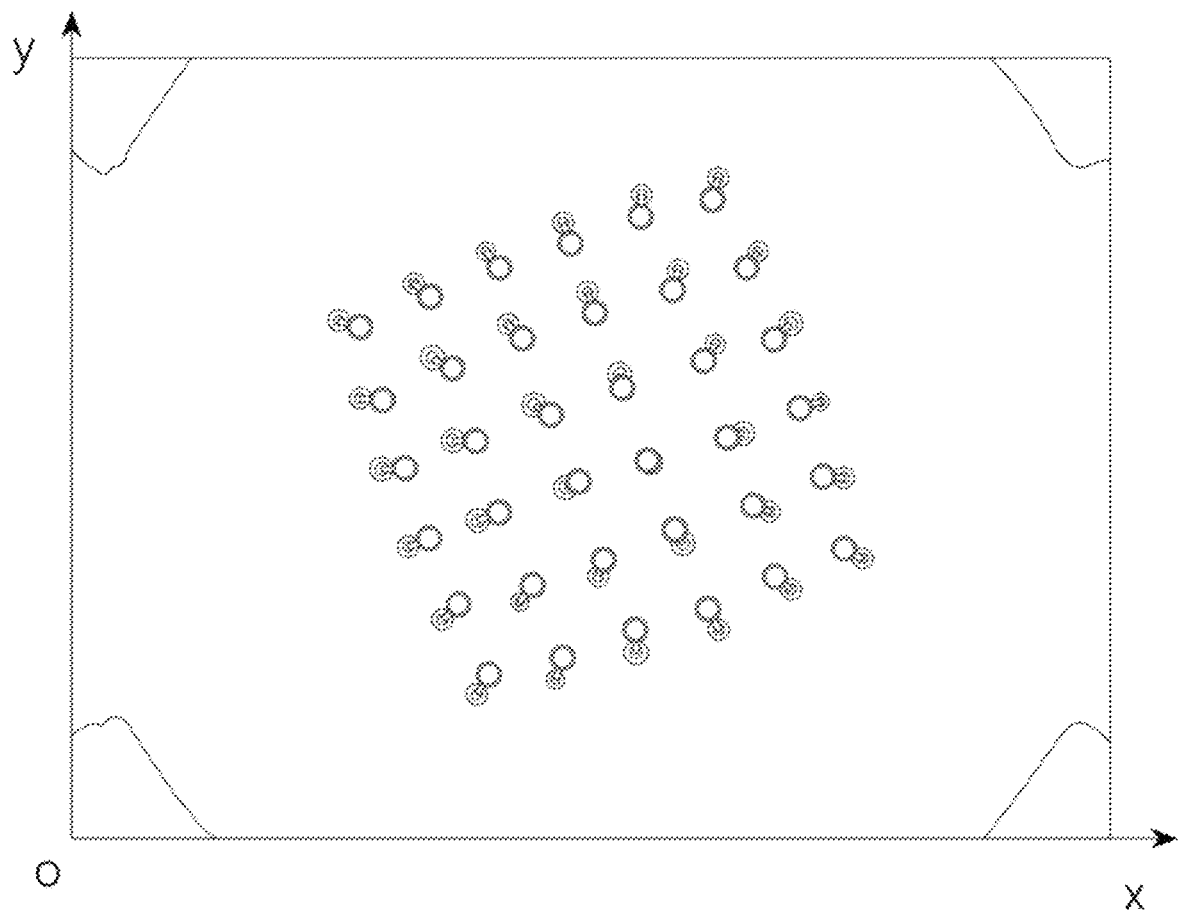
FIG. 5 is a schematic diagram of a displacement record of a marking point according to an exemplary embodiment of this application.

The marking pattern including the marking points is used as an example. The foregoing chip can track a movement of each marking point by marking two closest marking points 112 in two adjacent images as the same mark. That is, as shown in FIG. 5, the displacement of the marking point 112 is calculated and used as the difference feature.

Step 203: Process the difference feature of the marking patterns using a feedforward neural network to obtain a tactile measurement result.

The feedforward neural network may be one or more neural network models, and each neural network model corresponds to a different function. A quantity of hidden layers in the feedforward neural network is less than a threshold. In some embodiments, the threshold is 2.

The hidden layer and an output layer of each model in the feedforward neural network are called, and the difference feature of the marking pattern is processed based on the models for achieving different functions in the feedforward neural network, to obtain the tactile measurement result.

In some embodiments, neural network models with different functions, and quantities of hidden layers and output layers may be designed based on a measurement requirement. In this embodiment of this application, each of quantities of hidden layers and output layers is 1.

In conclusion, in the method provided in this embodiment of this application, the difference feature of the marking patterns is used as an input feature. Compared with a related technology of using an image as the input feature, a quantity of the input features can be reduced, thereby reducing an amount of calculation. In addition, compared with a CNN network with a larger quantity of layers, the feedforward neural network with a quantity of hidden layers less than the threshold is used for feature extraction and prediction, which can predict a close or better tactile measurement result through a smaller amount of calculation.

Figure 6:
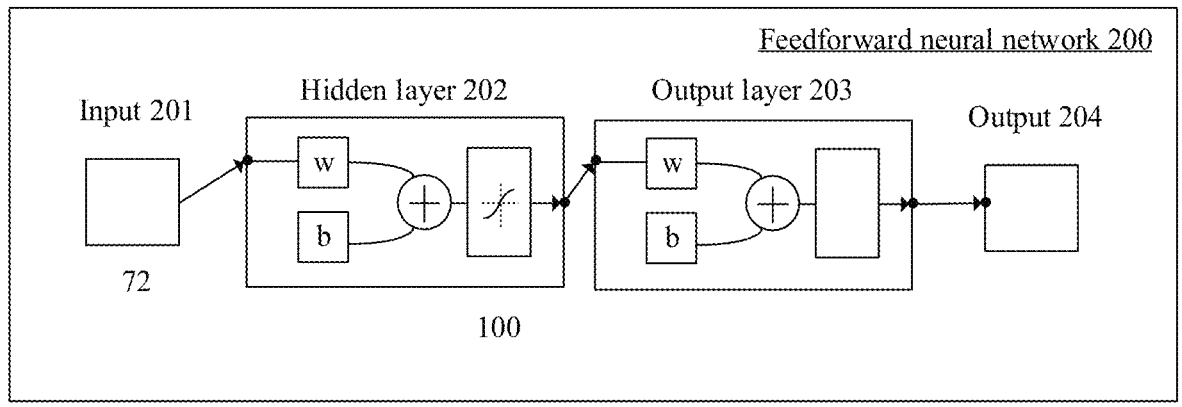
FIG. 6 is a schematic structural diagram of a feedforward neural network according to an exemplary embodiment of this application.

FIG. 6 is a schematic structural diagram of a feedforward neural network 200 according to an exemplary embodiment. The feedforward neural network 200 is provided with a hidden layer 202 and an output layer 203.

Figure 7:
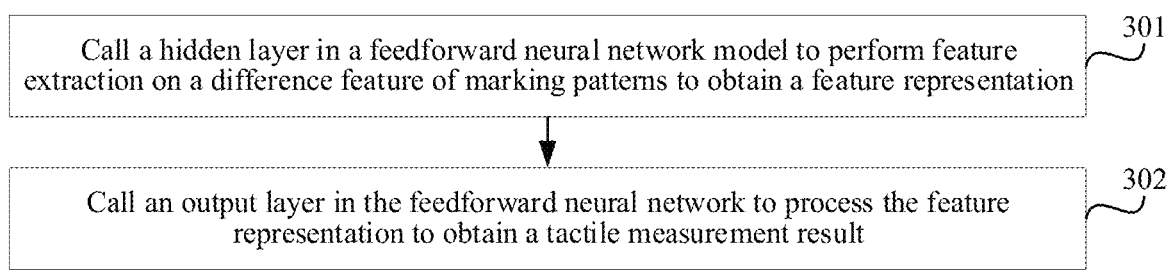
FIG. 7 is a flowchart of a usage method of a feedforward neural network according to an exemplary embodiment of this application.

In some embodiments based on FIG. 4, as shown in FIG. 7, the method in which the feedforward neural network 200 processes the difference feature of the marking patterns 112 to obtain the measurement result includes the following steps:

Step 301: Call a hidden layer 201 in a feedforward neural network 200 to perform feature extraction on a difference feature of marking patterns 112 to obtain a feature representation.

Step 302: Call an output layer 202 in the feedforward neural network to process the feature representation to obtain a tactile measurement result.

Herein, n hidden neurons are provided in the hidden layer 201, and n is an integer. In an example of this embodiment, the hidden layer 201 is constructed based on sigmoid hidden neurons, and the output layer 202 is constructed based on softmax output neurons or linear output neurons.

Based on this embodiment of this application, a quantity of neurons in the hidden layer may be any integer greater than zero, and a quantity of inputted feature values may also be any integer greater than zero. The neurons may be designed based on different to-be-achieved functions.

In some embodiments, the marking pattern 112 is implemented by using 36 marking points. The hidden layer 201 provided with 100 hidden neurons is used as an example for description, 72 feature values are inputted into an input layer 201 in the feedforward neural network 200, and the feature values are displacement $(x1, y1, x2, y2, \ldots, x36, y36)$ of the 36 marking points 112.

In conclusion, on the premise that structures of the tactile sensors are similar, the structure of the tactile sensor in this application is relatively simple; and the method of inputting displacement of the marking point in the continuous image array into the neural network model as the feature value is used, and the feedforward neural network with a simple hidden layer is designed to measure the contacted object, which simplifies the measurement process and reduces the quantity of training samples.

The hidden layer in the structure of the feedforward neural network unidirectionally transmits information, and there is at least one hidden layer. FIG. 6 is a schematic diagram of a feedforward neural network 200 according to an exemplary embodiment.

The tactile measurement result includes one of the following three features:

first, a contact location;

second, three-dimensional information of a contact force, where the three-dimensional information includes a magnitude and/or a direction of the contact force; and third, a local curvature radius of a contact surface.

Figure 8:
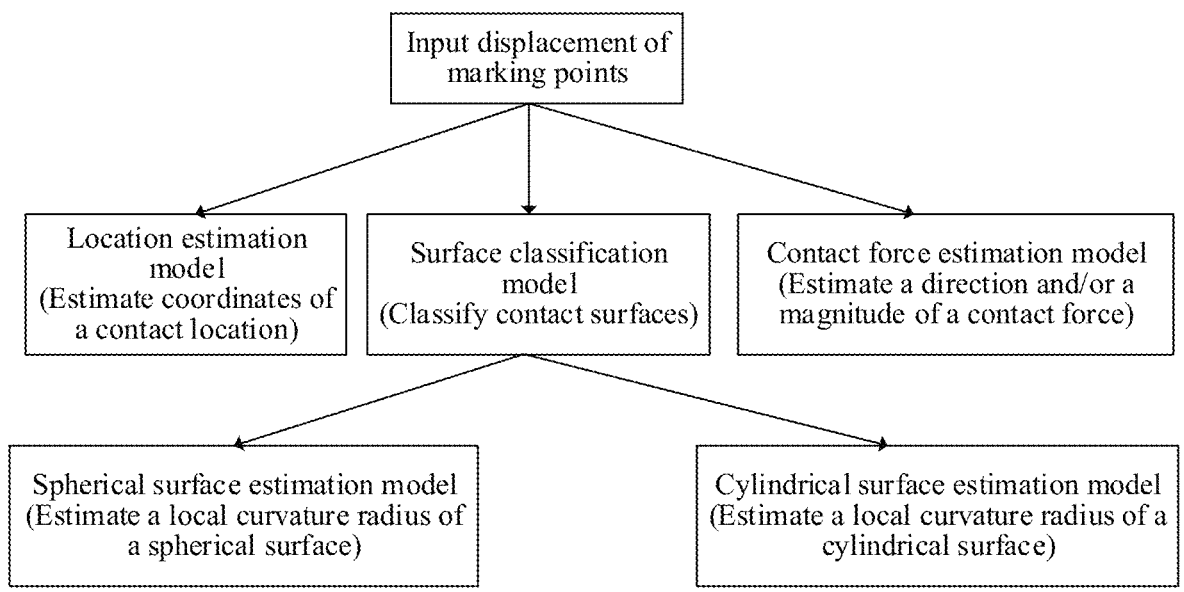
FIG. 8 is a schematic structural diagram of models in a feedforward neural network according to an exemplary embodiment of this application.

As shown in FIG. 8, the feedforward neural network includes: a location estimation model for estimating a location of the contact point, a contact force estimation model for estimating three-dimensional information of the contact force (the magnitude and/or direction of the contact force), a surface classification model for classifying the contact surfaces, and a curvature estimation model for estimating the local curvature radius of the contact surface.

Figure 9:
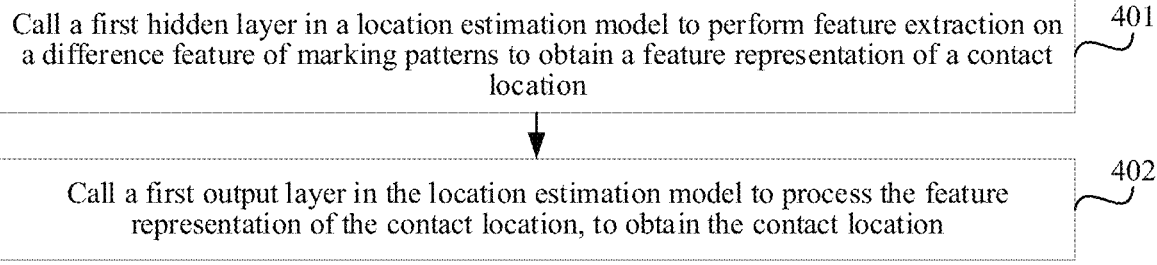
FIG. 9 is a flowchart of a usage method of a location estimation model according to an exemplary embodiment of this application.

The following describes a measurement process of a contact location with reference to FIG. 9. Based on this embodiment of this application, the tactile measurement result includes a contact location; and the feedforward neural network includes: a location estimation model, and the location estimation model includes a first hidden layer and a first output layer. As shown in FIG. 9, a contact location measurement method includes the following steps.

Step 401: Call a first hidden layer in a location estimation model to perform feature extraction on a difference feature of marking patterns to obtain a feature representation of a contact location.

The marking pattern including the marking points arranged in the array and the difference feature of the marking patterns including the displacement of the marking points are used as an example. The first hidden layer is used to perform feature extraction on the displacement of the inputted marking points, and the first hidden layer is constructed based on sigmoid hidden neurons, the feature representation of the contact location is to represent, in a form of a vector, a feature representation corresponding to the contact location. This is described in description of step 301 of using the feedforward neural network. Details are not repeated herein again.

Step 402: Call a first output layer in the location estimation model to process the feature representation of the contact location, to obtain the contact location.

This is described in description of step 302 of using the feedforward neural network. Details are not repeated herein again.

Figure 22:
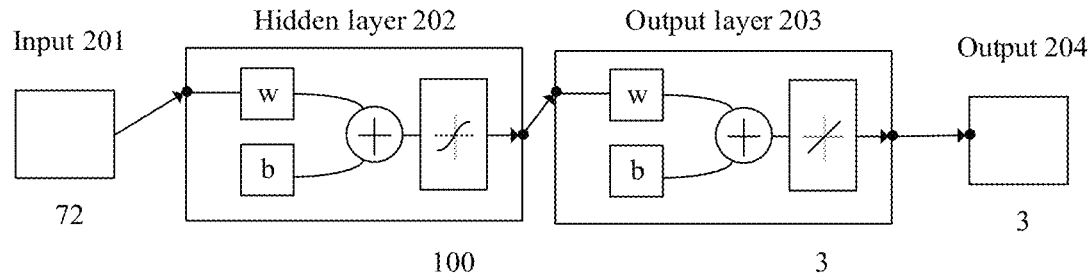
FIG. 22 is a schematic structural diagram of another model other than a surface classification model according to an exemplary embodiment of this application.

In some embodiments, quantities of hidden layers and output layers in the location estimation model are both integers greater than zero, and the neurons may be selected based on different to-be-achieved functions. In this application, as shown in FIG. 22, an example in which each of quantities of first hidden layers and first output layers is 1 and the neurons are respectively selected as sigmoid hidden neurons and linear output neurons is used for description.

The feature value is inputted into the feedforward neural network 200, and the sigmoid hidden neuron in the first hidden layer in the location estimation model is called to process the feature value to obtain the feature representation of the contact location; the feature representation of the contact location is used as an input value and is inputted into the first output layer, and the linear output neuron in the first output layer performs feature extraction on the feature representation to obtain and output three-dimensional coordinates of the contact location in space. For a specific three-dimensional coordinate system, refer to the following coordinate system in a case that the sample contact location is obtained (referring to FIG. 26).

Figure 10:
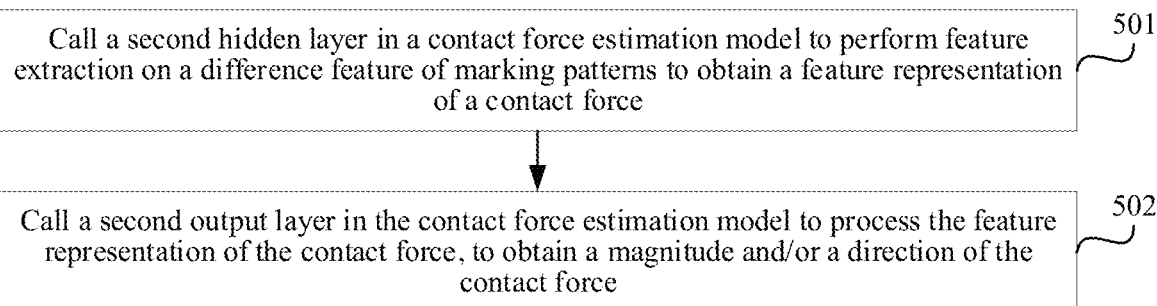
FIG. 10 is a flowchart of a usage method of a contact force estimation model according to another exemplary embodiment of this application.

The following describes a measurement process of the three-dimensional information of the contact force with reference to FIG. 10. Based on this embodiment of this application, the tactile measurement result includes the three-dimensional information of the contact force; and the feedforward neural network 200 includes: a contact force estimation model, and the contact force estimation model includes a second hidden layer and a second output layer. As shown in FIG. 10, a method for measuring the three-dimensional information of the contact force includes the following steps.

Step 501: Call a second hidden layer in a contact force estimation model to perform feature extraction on a difference feature of marking patterns to obtain a feature representation of a contact force.

The marking pattern including the marking points arranged in the array and the difference feature of the marking patterns including the displacement of the marking points are used as an example. The second hidden layer inputs the displacement of the marking points as the feature value to obtain the feature representation of the contact force, and the feature representation of the contact force is used as an input for the second output layer.

Step 502: Call a second output layer in the contact force estimation model to process the feature representation of the contact force, to obtain three-dimensional information of the contact force, the three-dimensional information including a magnitude and/or a direction.

This is described in description of step 402 of using the feedforward neural network. Details are not repeated herein again.

In some embodiments, quantities of second hidden layers and second output layers in the contact force estimation model are both integers greater than zero, and the neurons may be selected based on different to-be-achieved functions. In this application, as shown in FIG. 22, an example in which each of quantities of second hidden layers and second output layers is 1 and the neurons are respectively selected as sigmoid hidden neurons and linear output neurons is used for description. The difference feature is inputted into the feedforward neural network 200, and the sigmoid hidden neuron in the second hidden layer in the contact force estimation model is called to process the feature value to obtain the feature representation of the contact location; the feature representation of the contact location is used as an input value and is inputted into the second output layer, and the linear output neuron in the second output layer estimates the feature representation to obtain three-dimensional information of the contact force in space, that is, to obtain and output a magnitude and/or a direction of the contact force.

The "magnitude and/or direction" include/includes: only the magnitude; or only the direction; or the magnitude and the direction.

Figure 11:
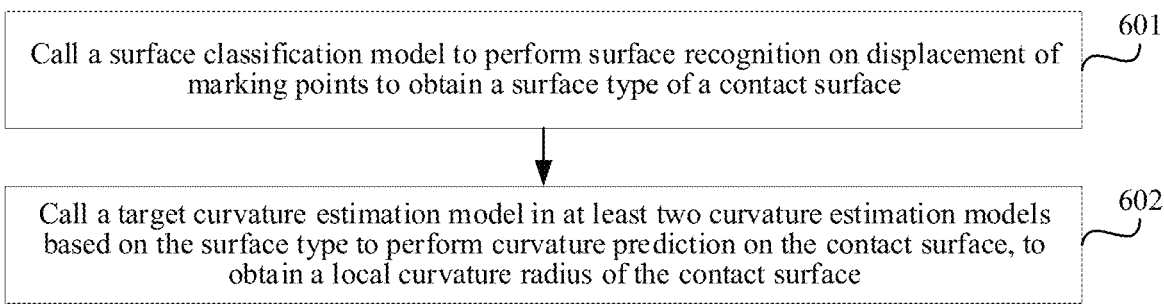
FIG. 11 is a flowchart of a usage method of a surface classification model and a curvature estimation model according to an exemplary embodiment of this application.

The following describes a measurement process of a local curvature radius with reference to FIG. 11. Based on this embodiment of this application, the tactile measurement result includes a local curvature radius of a contact surface; and the feedforward neural network includes: a surface classification model and at least two curvature estimation models. In an example of this embodiment, the at least two curvature estimation models include: a spherical surface curvature estimation model and a cylindrical surface curvature estimation model.

As shown in FIG. 11, a method for measuring the local curvature radius of the contact surface includes the following steps.

Step 601: Call a surface classification model to perform surface recognition on displacement of marking points to obtain a surface type of a contact surface.

The surface classification model is a neural network model for predicting a surface type of a contacted object. The surface type includes at least one of a spherical surface, a flat surface, and a cylindrical surface.

Step 602: Call a target curvature estimation model in at least two curvature estimation models based on the surface type to perform curvature prediction on the contact surface, to obtain a local curvature radius of the contact surface.

The chip calls a related curvature estimation model to estimate the curvature based on the type of the measured contact surface.

Figure 12:
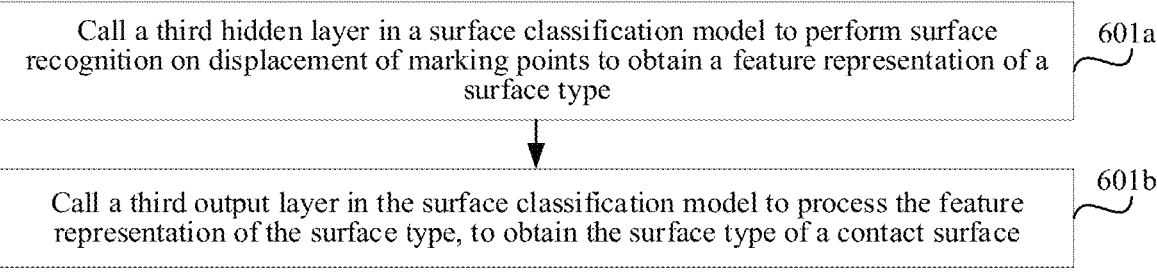
FIG. 12 is a flowchart of a usage method of a surface classification model according to an exemplary embodiment of this application.

In some embodiments based on FIG. 11, the surface classification model includes a third hidden layer and a third output layer. As shown in FIG. 12, step 601 includes the following sub-steps:

Step 601a: Call a third hidden layer in a surface classification model to perform surface recognition on displacement of marking points to obtain a feature representation of a surface type.

Step 601b: Call a third output layer in the surface classification model to process the feature representation of the surface type, to obtain the surface type of a contact surface.

The surface classification model is called to output the displacement of the marking points as the surface type. The surface type includes any one of a flat surface, a spherical surface, and a cylindrical surface.

Figure 13:
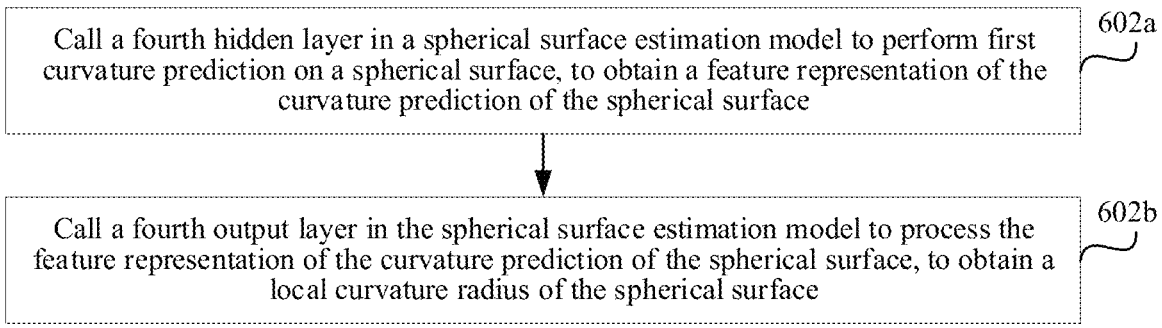
FIG. 13 is a flowchart of a usage method of a curvature estimation model of a spherical surface according to an exemplary embodiment of this application.

When the surface type is the spherical surface, perform steps shown in FIG. 13. When the surface type is the cylindrical surface, perform steps shown in FIG. 14.

In some embodiments based on FIG. 11, the spherical surface estimation model includes a fourth hidden layer and a fourth output layer. As shown in FIG. 13, step 602 includes the following sub-steps:

Step 602a: Call a fourth hidden layer in a spherical surface estimation model to perform first curvature prediction on a spherical surface, to obtain a feature representation of the curvature prediction of the spherical surface.

Step 602*b*: Call a fourth output layer in the spherical surface estimation model to process the feature representation of the curvature prediction of the spherical surface, to obtain a local curvature radius of the spherical surface.

Figure 14:
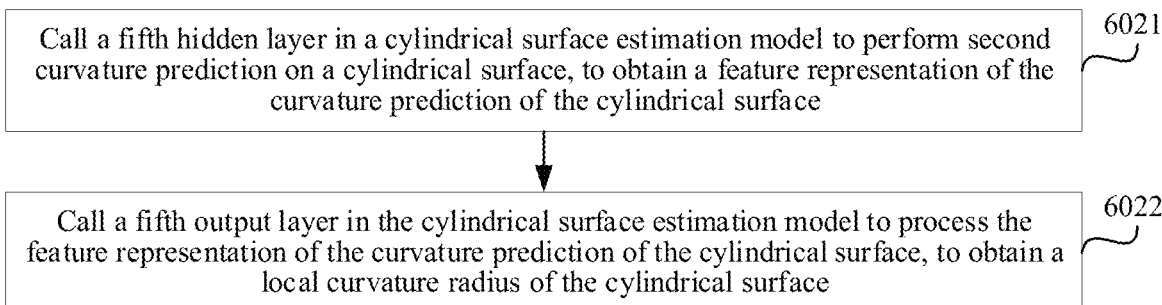
FIG. 14 is a flowchart of a usage method of a curvature estimation model of a cylindrical surface according to an exemplary embodiment of this application.

In some embodiments based on FIG. 11, the cylindrical surface estimation model includes a fifth hidden layer and a fifth output layer. As shown in FIG. 14, step 602 includes the following sub-steps:

Step 6021: Call a fifth hidden layer in a cylindrical surface estimation model to perform second curvature prediction on a cylindrical surface, to obtain a feature representation of the curvature prediction of the cylindrical surface.

Step 6022: Call a fifth output layer in the cylindrical surface estimation model to process the feature representation of the curvature prediction of the cylindrical surface, to obtain a local curvature radius of the cylindrical surface.

The surface type of the contact surface may be, but is not limited to, a spherical surface, a cylindrical surface, a flat surface, or the like. In some embodiments, an example in which the contact surface is the spherical surface is used for description, and the hidden neuron and the output neuron of the surface classification model may be set based on different to-be-achieved functions. A specific structure of the surface classification model of this application is described in detail below (referring to FIG. 23).

When the detected contact surface is the spherical surface, the displacement of the marking point is inputted into the surface classification model as the feature value. The third hidden layer in the surface classification model performs surface recognition on the feature value to obtain a feature representation of the spherical surface type; the feature representation of the spherical surface type is inputted into the third output layer as the input value, and an obtained contact surface type is the spherical surface; the chip calls the fourth hidden layer to predict the curvature radius of the spherical surface based on the contact surface type being the spherical surface, to obtain a feature representation of spherical surface curvature prediction; the feature representation of the spherical surface curvature is inputted into the fourth output layer, and the fourth output layer is called to process the feature representation of the spherical surface curvature prediction, to obtain and output the local curvature radius of the spherical surface.

When the detected contact surface is the cylindrical surface, the movement displacement of the marking point is inputted into the surface classification model as the feature value. The third hidden layer in the surface classification model performs surface recognition on the feature value to obtain a feature representation of the cylindrical surface type; the feature representation of the cylindrical surface type is inputted into the third output layer as the input value, and an obtained contact surface type is the cylindrical surface; the chip calls the fifth hidden layer to predict the curvature radius of the cylindrical surface based on the contact surface type being the cylindrical surface, to obtain a feature representation of cylindrical surface curvature prediction; the feature representation of the cylindrical surface curvature is inputted into the fifth output layer, and the fifth output layer is called to process the feature representation of the cylindrical surface curvature prediction, to obtain and output the local curvature radius of the cylindrical surface.

The local curvature radius is a continuous interval other than an intermittent interval.

Figure 15:
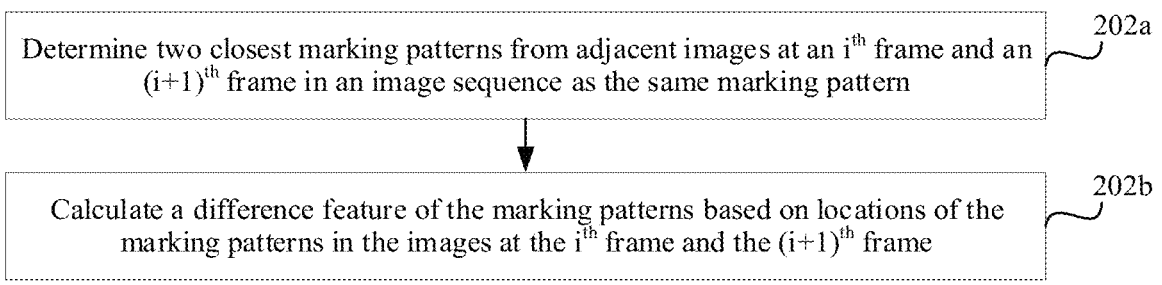
FIG. 15 is a flowchart of a calculation method of displacement of a marking point in an image array according to an exemplary embodiment of this application.

In some embodiments based on the foregoing embodiments, as shown in FIG. 15, calculating the difference feature of the marking patterns based on the marking patterns in the adjacent images in the image sequence includes the following steps:

Step 202*a*: Determine two closest marking patterns from adjacent images at an ith frame and an (i+1)th frame in an image sequence as the same marking pattern.

Step 202*b*: Calculate a difference feature of the marking patterns based on locations (or locations and deformation) of the marking patterns in the images at the ith frame and the (i+1)th frame.

In some embodiments, i equal to 1 is used for description, and two closest marking points are determined from adjacent images at the first frame and the second frame in an image sequence as the same marking point. As shown in FIG. 15, based on locations of the marking point in the images at the first frame and the second frame, displacement of the marking point is calculated. A value of i is an integer.

The following describes the method for training the feedforward neural network mentioned in the foregoing embodiments.

Figure 16:
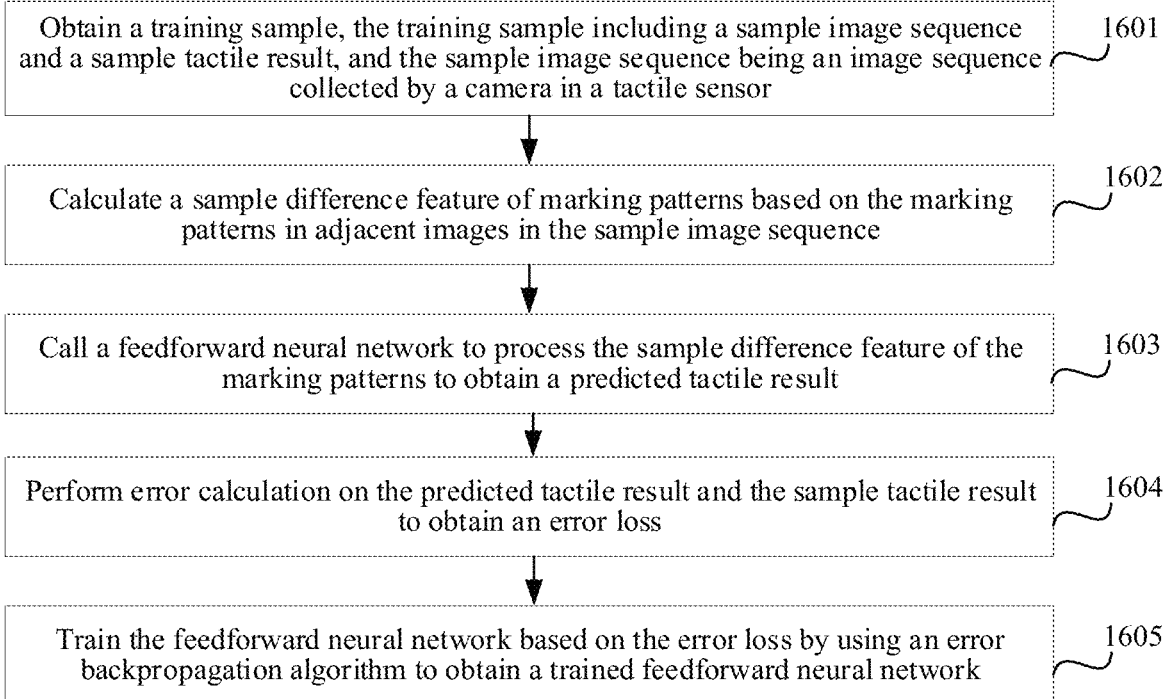
FIG. 16 is a flowchart of a training method of vision-based tactile measurement according to an exemplary embodiment of this application.

FIG. 16 is a flowchart of a method for training a feedforward neural network according to an exemplary embodiment. Based on this embodiment of this application, as shown in FIG. 16, the method includes the following steps:

Step 1601: Obtain a training sample, the training sample including a sample image sequence and a sample tactile result, and the sample image sequence being an image sequence collected by an image sensing component in a tactile sensor.

Step 1602: Calculate a sample difference feature of marking patterns based on the marking patterns in adjacent images in the sample image sequence.

Exemplarily, based on the locations of the marking patterns in the adjacent images in the sample image sequence, the sample difference feature of the marking patterns is calculated; alternatively, based on the locations and deformation (such as a magnitude) of the marking patterns in the adjacent images in the sample image sequence, the sample difference feature of the marking patterns is calculated.

When the marking pattern includes at least two marking points, the sample difference feature of the marking patterns includes displacement of the marking points, or displacement and deformation of the marking points.

When the marking pattern includes a grid, the sample difference feature of the marking patterns includes displacement of grid points in the grid, or displacement of the grid points and deformation of grid lines in the grid.

Step 1603: Call a feedforward neural network to process the sample difference feature of the marking patterns to obtain a predicted tactile result. A quantity of hidden layers in the feedforward neural network is less than a threshold.

Step 1604: Perform error calculation on the predicted tactile result and the sample tactile result to obtain an error loss.

Step 1605: Train the feedforward neural network based on the error loss by using an error backpropagation algorithm to obtain a trained feedforward neural network.

The feedforward neural network used in the method is consistent with the foregoing neural network model. Herein, the feedforward neural network is trained. A specific structure of the feedforward neural network is not described herein.

In some embodiments, the hidden layer and the output layer are provided in the feedforward neural network; and step 1603 of the calling a feedforward neural network to process the sample difference feature of the marking patterns to obtain a predicted tactile result includes: calling the hidden layer in the feedforward neural network to perform feature extraction on the sample difference feature of the marking patterns to obtain a feature representation; and calling the output layer in the feedforward neural network to process the feature representation to obtain the predicted tactile result.

In some embodiments, n hidden neurons are provided in the hidden layer, and n is an integer; the hidden layer is constructed based on hidden neurons of a logistic sigmoid function; and the output layer is constructed based on output neurons of a normalized exponential softmax function or linear output neurons.

Figure 17:
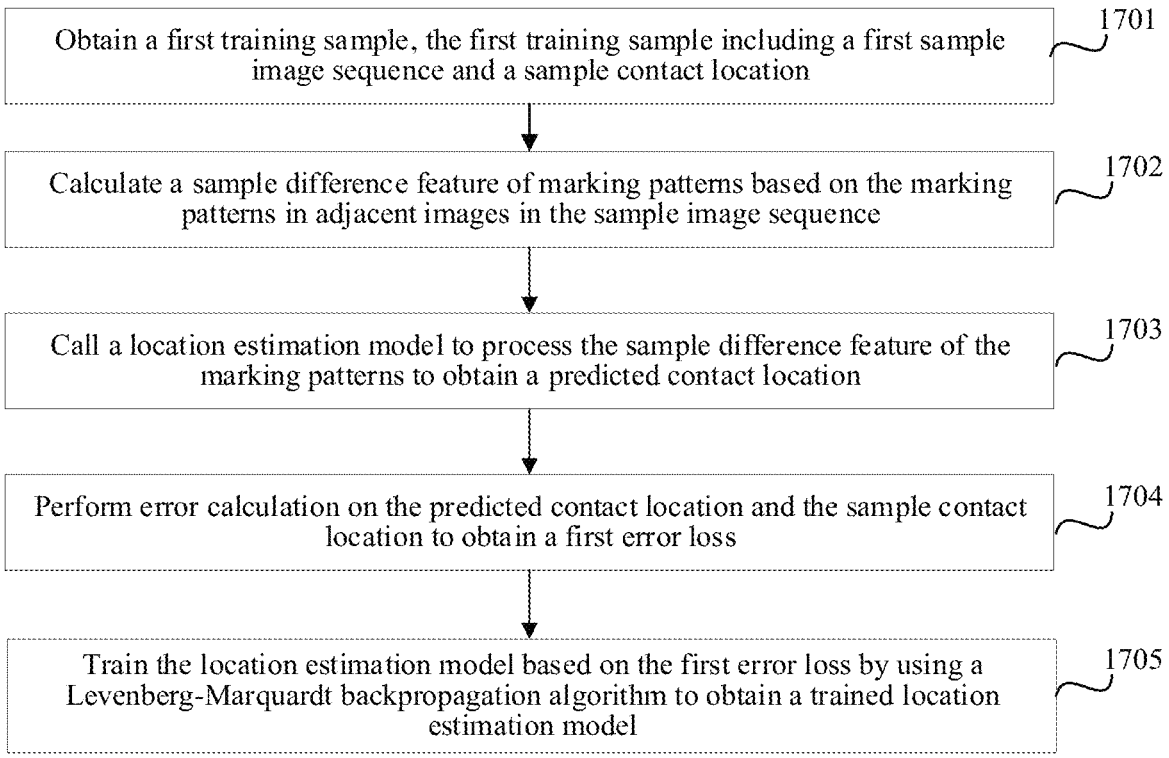
FIG. 17 is a flowchart of a method for training a location estimation model according to an exemplary embodiment of this application.

Based on this embodiment of this application, the feedforward neural network includes a location estimation model for estimating a contact location, and the location estimation model includes a first hidden layer and a first output layer. As shown in FIG. 17, a training method includes the following steps.

Step 1701: Obtain a first training sample, the first training sample including a first sample image sequence and a sample contact location.

Exemplarily, the sample contact location is a location represented by coordinates in a form of three-dimensional coordinates.

Step 1702: Calculate a sample difference feature of marking patterns based on the marking patterns in adjacent images in the sample image sequence.

Step 1703: Call a location estimation model to process the sample difference feature of the marking patterns to obtain a predicted contact location.

Step 1704: Perform error calculation on the predicted contact location and the sample contact location to obtain a first error loss.

Step 1705: Train the location estimation model based on the first error loss by using a Levenberg-Marquardt backpropagation algorithm to obtain a trained location estimation model.

In some embodiments, an example in which the first training sample is the displacement of the marking points in the image array and coordinates of an actual sample contact location is used for description. The displacement of the marking points in the image array and the coordinates (x1, y1, z1) of the sample contact location are obtained, and the obtained displacement of the marking points in the image array is inputted into the first hidden layer and the first output layer. The first output layer obtains predicted coordinates (x1', y1', A') of the sample contact location, and processes the coordinates (x1, y1, z1) and the predicted coordinates (x1', y1', A') of the sample contact location by using the Levenberg-Marquardt backpropagation algorithm, to obtain the first error loss. The location estimation model is trained based on the first error loss, to obtain a trained location estimation model.

Figure 18:
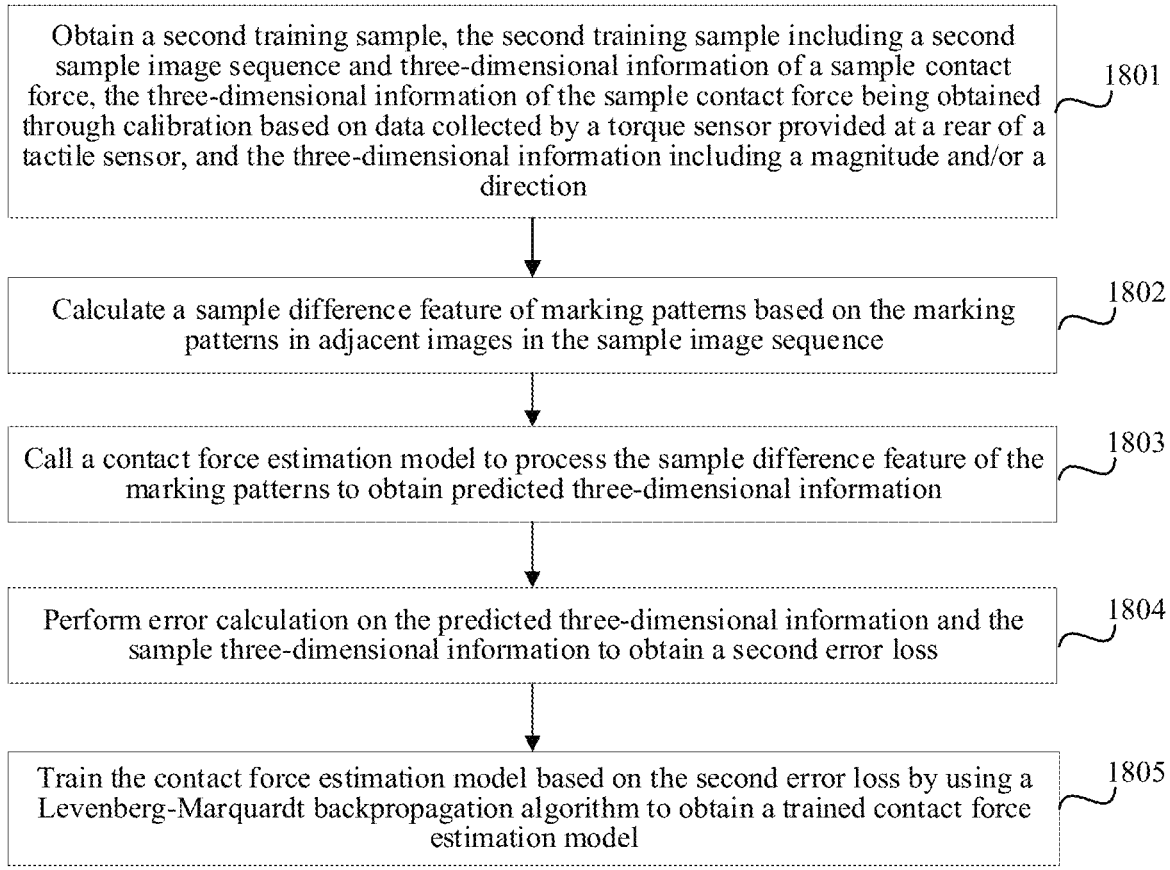
FIG. 18 is a flowchart of a method for training a contact force estimation model according to an exemplary embodiment of this application.

Based on this embodiment of this application, the feedforward neural network includes a contact force estimation model for estimating a three-dimensional contact force, and the contact force estimation model includes a second hidden layer and a second output layer. As shown in FIG. 18, a training method includes the following steps.

Step 1801: Obtain a second training sample, the second training sample including a second sample image sequence and sample three-dimensional information, the sample three-dimensional information being obtained through calibration based on data collected by a torque sensor provided at a rear of a tactile sensor, and the three-dimensional information including a magnitude and/or a direction.

Step 1802: Calculate a sample difference feature of marking patterns based on the marking patterns in adjacent images in the sample image sequence.

Step 1803: Call a contact force estimation model to process the sample difference feature of the marking patterns to obtain predicted three-dimensional information.

Step 1804: Perform error calculation on the predicted three-dimensional information and the sample three-dimensional information to obtain a second error loss.

Step 1805: Train the contact force estimation model based on the second error loss by using a Levenberg-Marquardt backpropagation algorithm to obtain a trained contact force estimation model.

In some embodiments, an example in which the second training sample is the displacement of the marking points in the image array and actual three-dimensional information of a sample contact force is used for description. The displacement of the marking points in the image array and the sample three-dimensional information (fx, fy, fz) are obtained, and the obtained displacement of the marking points in the image array is inputted into the second hidden layer and the second output layer. The second output layer obtains predicted three-dimensional information (fx', fy', fz') of the sample contact force, and processes the sample three-dimensional information (fx, fy, fz) and the predicted three-dimensional information (fx', fy', fz') by using the Levenberg-Marquardt backpropagation algorithm, to obtain the second error loss. The location estimation model is trained based on the second error loss, to obtain a trained location estimation model.

Figure 19:
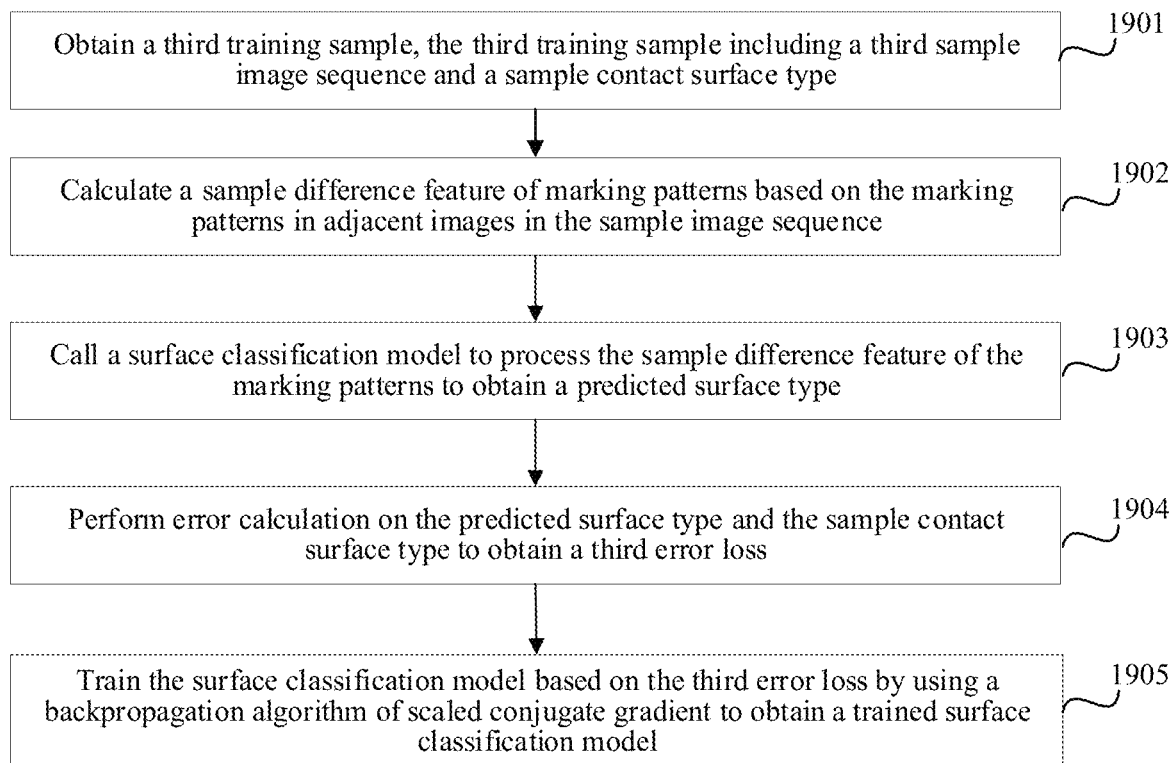
FIG. 19 is a flowchart of a method for training a surface classification model according to an exemplary embodiment of this application.

Based on this embodiment of this application, the feedforward neural network includes a surface classification model for classifying contact surfaces, and the surface classification model includes a third hidden layer and a third output layer. As shown in FIG. 19, a training method includes the following steps.

Step 1901: Obtain a third training sample, the third training sample including a third sample image sequence and a sample surface type.

Step 1902: Calculate a sample difference feature of marking patterns based on the marking patterns in adjacent images in the sample image sequence.

Step 1903: Call a surface classification model to process the sample difference feature of the marking patterns to obtain a predicted surface type.

Step 1904: Perform error calculation on the predicted surface type and the sample surface type to obtain a third error loss.

Step 1905: Train the surface classification model based on the third error loss by using a backpropagation algorithm of scaled conjugate gradient to obtain a trained surface classification model.

In some embodiments, an example in which the third training sample is the displacement of the marking points in the image array and the sample surface type is used for description. The displacement of the marking points in the image array and the sample surface type (S1) are obtained, the obtained displacement of the marking points in the image array is inputted into the third hidden layer and the third output layer, and the third output layer obtains a predicted surface type (S1') of the contact surface, and processes the sample surface type (S1) and the predicted surface type (S1') by using the backpropagation algorithm of scaled conjugate gradient, to obtain the third error loss. The surface classification model is trained based on the third error loss, to obtain a trained surface classification model.

Figure 23:
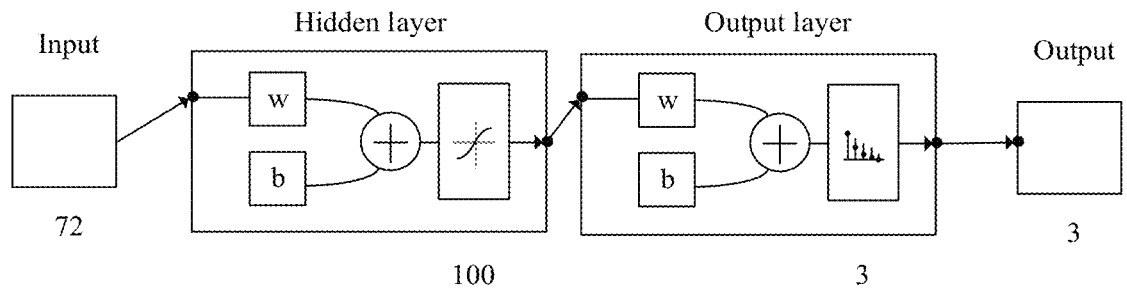
FIG. 23 is a schematic diagram of a model structure of a surface classification model according to an exemplary embodiment of this application.

Based on this embodiment of this application, the structure of the surface classification model is shown in FIG. 23, and one or two third hidden layers may be provided. In some embodiments, an example in which one third hidden layer is provided is used for description. The surface classification model includes a third hidden layer and a third output layer. The hidden layer is constructed based on sigmoid hidden neurons, and the third output layer is constructed based on softmax hidden neurons. The sigmoid hidden neuron is suitable for classifying objects, while the softmax hidden neuron enables production of different output results for different shapes corresponding to the contact surface.

Figure 20:
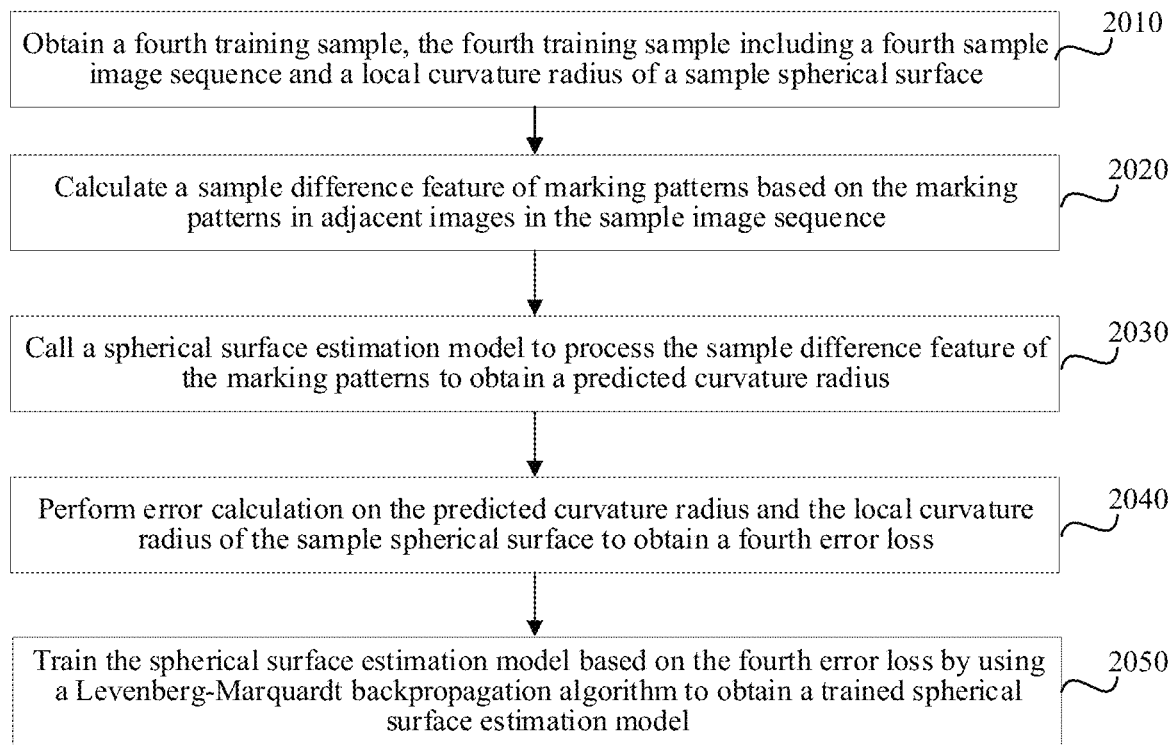
FIG. 20 is a flowchart of a method for training a spherical surface estimation model according to an exemplary embodiment of this application.

Based on this embodiment of this application, the curvature estimation model includes: a spherical surface estimation model, and the spherical surface estimation model includes a fourth hidden layer and a fourth output layer. As shown in FIG. 20, a training method includes the following steps.

Step 2010: Obtain a fourth training sample, the fourth training sample including a fourth sample image sequence and a local curvature radius of a sample spherical surface.

Step 2020: Calculate a sample difference feature of marking points based on marking patterns in adjacent images in the sample image sequence.

Step 2030: Call a spherical surface estimation model to process the sample difference feature of the marking patterns to obtain a predicted curvature radius.

Step 2040: Perform error calculation on the predicted curvature radius and the local curvature radius of the sample spherical surface to obtain a fourth error loss.

Step 2050: Train the spherical surface estimation model based on the fourth error loss by using a Levenberg-Marquardt backpropagation algorithm to obtain a trained spherical surface estimation model.

In some embodiments, an example in which the fourth training sample is the displacement of the marking points in the image array and the local curvature radius of the sample spherical surface is used for description. The displacement of the marking points in the image array and the local curvature radius (R1) of the sample spherical surface are obtained, and the obtained displacement of the marking points in the image array is inputted into the fourth hidden layer, and the fourth output layer obtains a predicted curvature radius (R1') of the sample spherical surface, and processes the local curvature radius (R1) of the sample spherical surface and the predicted curvature radius (R1') of the sample spherical surface by using the Levenberg-Marquardt backpropagation algorithm, to obtain the fourth error loss. The spherical surface estimation model is trained based on the fourth error loss, to obtain a trained spherical surface estimation model.

Figure 21:
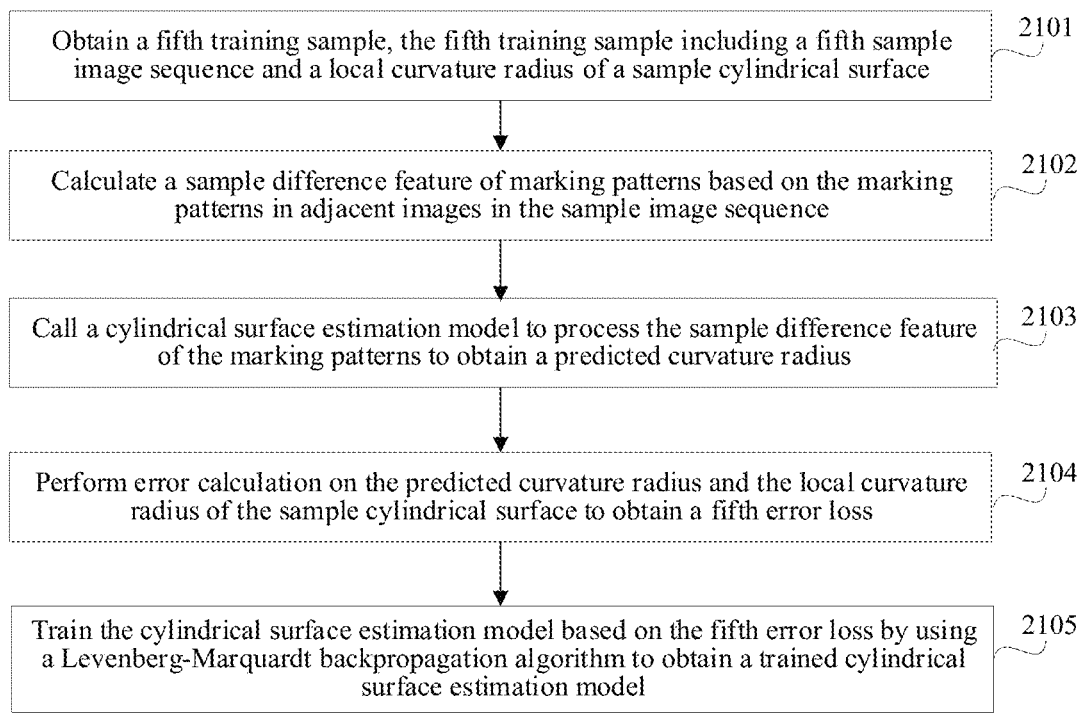
FIG. 21 is a flowchart of a method for training a cylindrical surface estimation model according to another exemplary embodiment of this application.

Based on this embodiment of this application, the curvature estimation model includes: a cylindrical surface estimation model, and the cylindrical surface estimation model includes a fifth hidden layer and a fifth output layer. As shown in FIG. 21, a training method includes the following steps.

Step 2101: Obtain a fifth training sample, the fifth training sample including a fifth sample image sequence and a local curvature radius of a sample cylindrical surface.

Step 2102: Calculate a difference feature of marking patterns based on the marking patterns in adjacent images in the sample image sequence.

Step 2103: Call a cylindrical surface estimation model to process the difference feature of the marking patterns to obtain a predicted curvature radius.

Step 2104: Perform error calculation on the predicted curvature radius and the local curvature radius of the sample cylindrical surface to obtain a fifth error loss.

Step 2105: Train the cylindrical surface estimation model based on the fifth error loss by using a Levenberg-Marquardt backpropagation algorithm to obtain a trained cylindrical surface estimation model.

In some embodiments, an example in which the fifth training sample is the displacement of the marking points in the image array and the curvature radius of the sample cylindrical surface is used for description. The displacement of the marking points in the image array and the local curvature radius (R2) of the sample cylindrical surface are obtained, and the obtained displacement of the marking points in the image array is inputted into the fifth hidden layer, and the fifth output layer obtains a predicted curvature radius (R2') of the sample cylindrical surface, and processes the local curvature radius (R2) of the sample cylindrical surface and the predicted curvature radius (R2') of the sample cylindrical surface by using the Levenberg-Marquardt backpropagation algorithm, to obtain the fifth error loss. The cylindrical surface estimation model is trained based on the fifth error loss, to obtain a trained cylindrical surface estimation model.

Figures 24, 25:
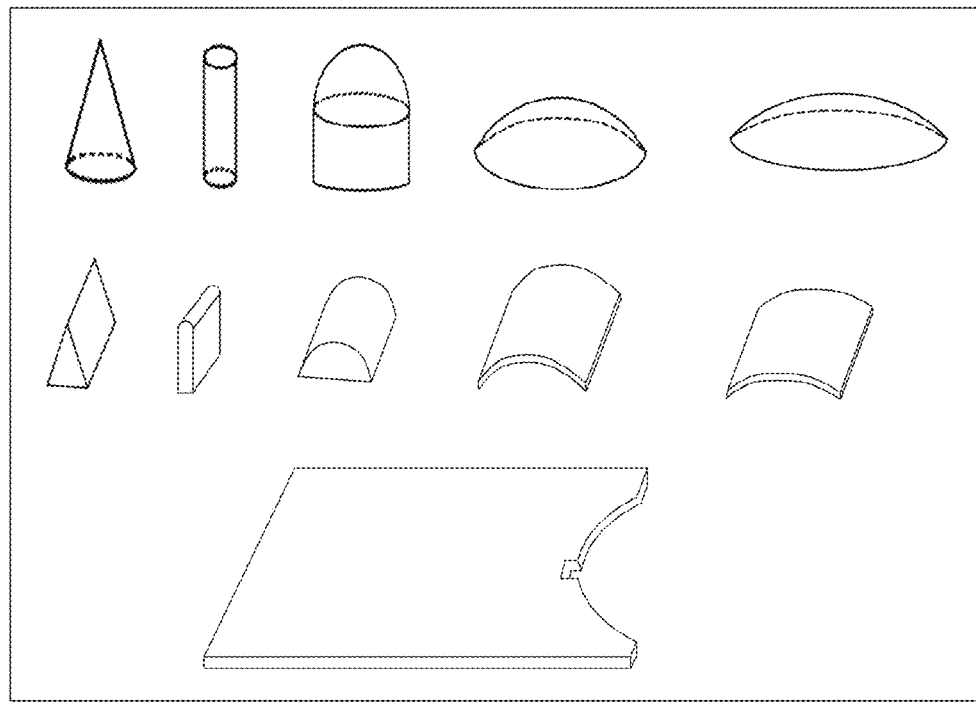
FIG. 24 is a schematic diagram of a sample curved surface used for training a feedforward neural network according to an exemplary embodiment of this application.
FIG. 25 shows a table of a quantity of sample curved surfaces used for training according to an exemplary embodiment of this application.

Based on this embodiment of this application, the contact surface is not limited to the spherical surface and the cylindrical surface. The type of the contact surface related to the training sample and a quantity of contact surfaces used for the training sample are shown in FIG. 24 and FIG. 25 respectively. In this application, contact surfaces in a plurality of shapes including a cone, a cylinder, a triangular pyramid, a triangular prism, and a flat surface are selected to train the surface classification model. Because a tip with a contact force greater than 5.5 N causes large deformation in a contact zone, a contact force less than 5.5 N is collected for a tip surface (for example, a triangular pyramid in FIG. 24) in this application (as shown in a table in FIG. 25).

When the feedforward neural network is trained, the feedforward neural network has the same internal structure as that of the feedforward neural network 200 used when not trained, and functions achieved through the internal structures are the same. Therefore, a structure of the feedforward neural network 200 used during training is not described in detail. For the specific structure, refer to the foregoing feedforward neural network 200.

Based on a block diagram of the tactile sensor system shown in FIG. 2, the tactile sensor system includes the foregoing tactile sensor and a chip 117 connected to the tactile sensor. The chip 117 includes a programmable logic circuit and/or a program instruction, and when running, the chip is configured to perform the foregoing vision-based tactile measurement method.

Based on the tactile sensor system 300 shown in FIG. 2, the system includes the foregoing tactile sensor and the foregoing chip 117. The chip 117 and the chip in the structure of the foregoing vision-based tactile measurement apparatus are the same type of chips 117. The chip 117 includes a programmable logic circuit and/or a program instruction, and when running, the chip is configured to perform the foregoing vision-based tactile measurement method.

Figure 26:
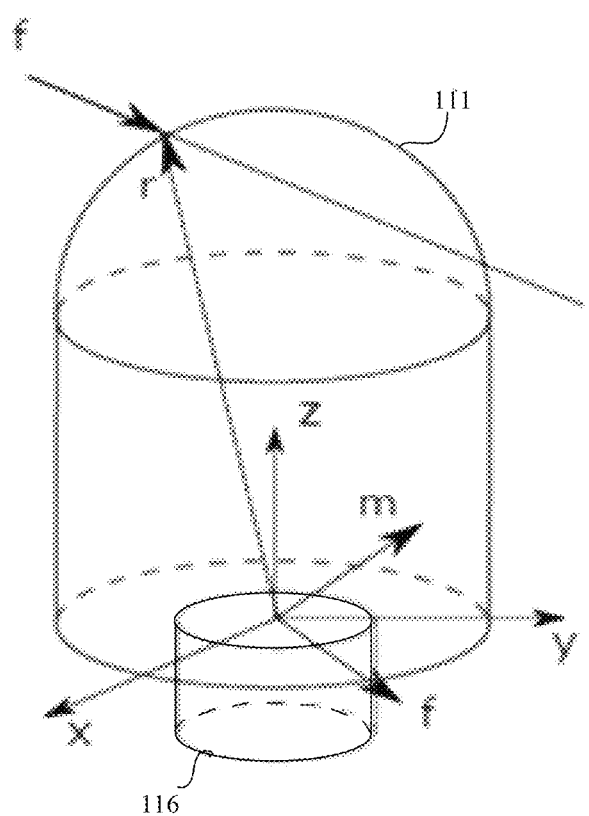
FIG. 26 is a schematic diagram of a geometric model of a tactile sensor according to an exemplary embodiment of this application.

Based on this embodiment of this application, for a manner of obtaining the sample contact location, refer to FIG. 26. FIG. 26 shows a geometric model of measuring a contact point by a force/torque sensor according to an exemplary embodiment. The actual contact location is obtained by using the torque sensor 116 mounted below the tactile sensor, and a virtual spatial coordinate system is established on the tactile sensor. A measured force f of the tactile sensor and a torque m generated by the contact force are in the coordinate system established by the tactile sensor. When there is only one contact point on the foregoing sensing face 111, the force f is the contact force, and the torque m may be expressed as the following equation:

$$m = -\hat{f}r$$

where r is a three-dimensional vector, that is, a location of the contact point relative to a coordinate system of a fingertip. $\hat{f}$ is a 3×3 antisymmetric matrix and used to represent a cross product. Because a rank of the matrix $\hat{f}$ is two, a solution to the formula may be expressed as the following equation:

$$r = -\hat{f}^+ m + cf$$

where $\hat{f}^+$ is pseudoinverse of $\hat{f}$, and c is a to-be-determined coefficient. Because $\hat{f}$ is a singular matrix that has a rank of two and meets that ff=0, f is a homogeneous solution to the formula. Geometrically, this formula represents a line in the coordinate system established on the tactile sensor. As shown in FIG. 26, there is an intersection point between the line and the sensing face 111. Therefore, the intersection point and normal at the intersection point can be calculated based on a known geometrical surface shape of the sensing face 111. Because the measured force f of the tactile sensor is a pressure received by the sensing face 111, a positive inner product is to be obtained based on the measured force f of the tactile sensor and inward normal.

In an example of this embodiment of this application, an entire sphere is used to represent the sensing face 111, and therefore, there are two intersection points between the line and the sensing face 111. If an inner product of the inner normal of one intersection point thereof and the measured force f of the tactile sensor is positive, the intersection point is an actual contact location, and the location is necessarily on the real sensing face 111. However, the other intersection point may or may not fall on the sensing face 111, but the other intersection point may be omitted because an inner product of the other intersection point and the normal is negative.

Figure 27:
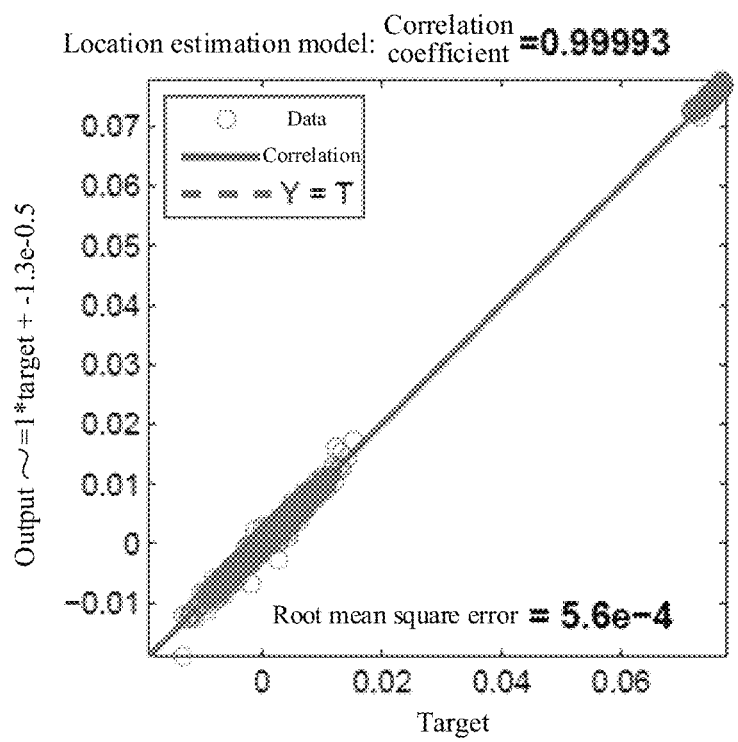
FIG. 27 is a schematic diagram of a training result of a location estimation model according to an exemplary embodiment of this application.

Based on this embodiment of this application, the location estimation model is trained, and a training result is shown in FIG. 27. Based on FIG. 27, it can be seen that a value of a correlation coefficient (R) of the location estimation model is close to 1, a root mean square error (RMSE) is approximately 0.6 mm, and this means that the trained location estimation model is highly related to consistency of the input data.

Figure 28:
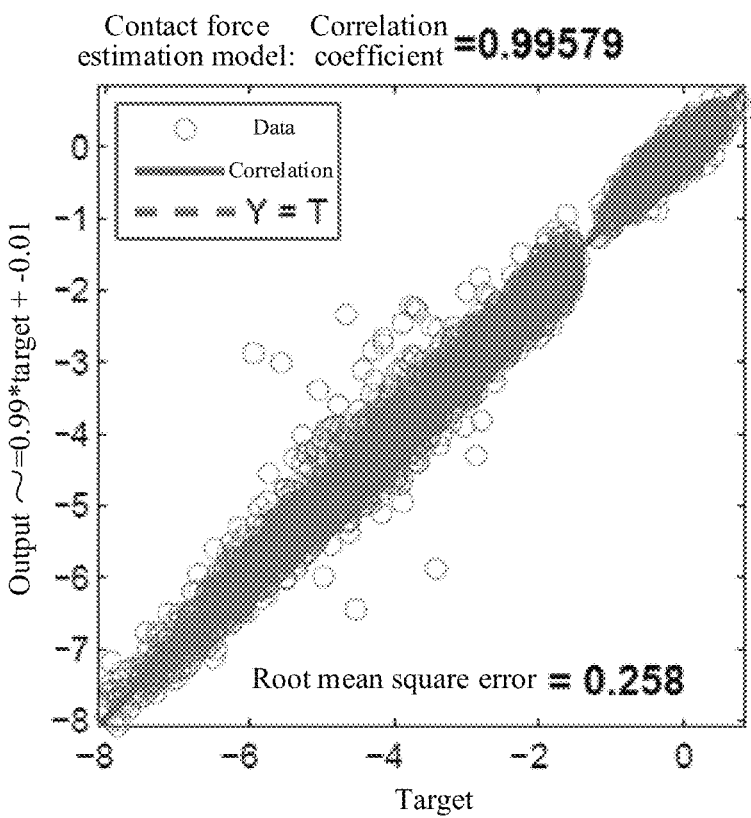
FIG. 28 is a schematic diagram of a training result of a contact force estimation model according to an exemplary embodiment of this application.

Based on this embodiment of this application, the contact force estimation model is trained, and a training result is shown in FIG. 28. Based on FIG. 28, it can be seen that a performance result of the contact force estimation model in a dynamic force range of 1.5 N to 8 N is as follows: After training, a value of a correlation coefficient (R) is close to 1, and a root mean square error (RMSE) is approximately 0.25 N. This means that the trained contact force estimation model is highly related to consistency of the input data.

Figure 29:
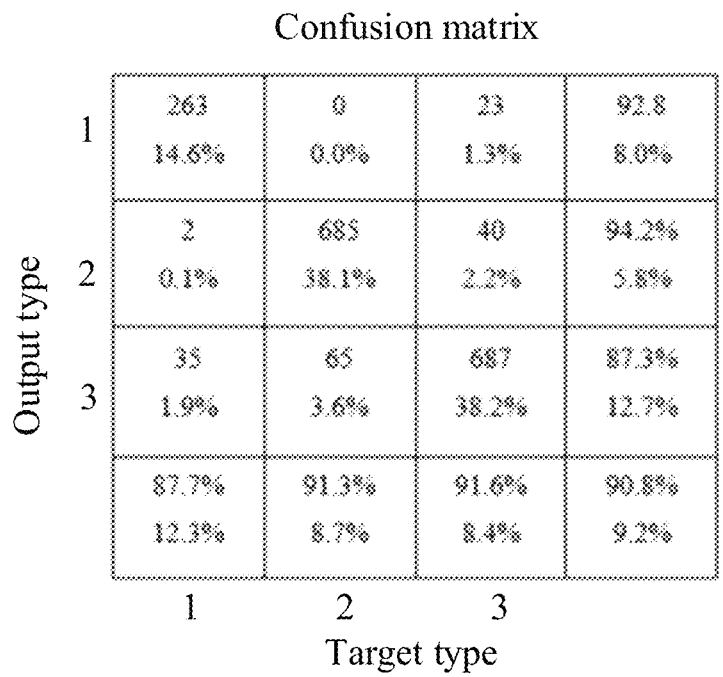
FIG. 29 shows a confusion matrix representing accuracy of a training result of a surface classification model according to an exemplary embodiment of this application.

Based on this embodiment of this application, the surface classification model is trained, and accuracy of a training result is shown in FIG. 29. The accuracy of the surface classification model is evaluated by using a confusion matrix. It can be seen from FIG. 29 that the overall accuracy of the surface classification model is 91%. This means that the accuracy of a classification function of the trained surface classification model is high.

Figure 30:
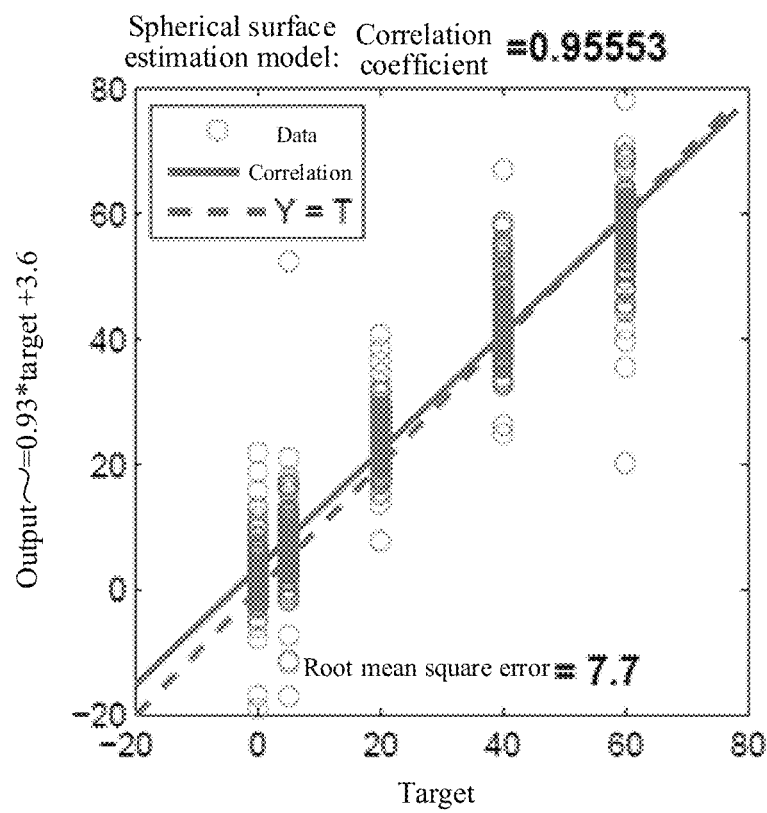
FIG. 30 is a schematic diagram of a training result of a spherical surface estimation model according to an exemplary embodiment of this application.

Based on this embodiment of this application, the spherical surface estimation model is trained, and a training result is shown in FIG. 30. Based on FIG. 30, it can be seen that a training result of the spherical surface estimation model is as follows: After training, a value of a correlation coefficient (R) is approximately 0.9, and a root mean square error (RMSE) is approximately 8 mm. This means that the trained spherical surface estimation model is highly related to consistency of the input data.

Figure 31:
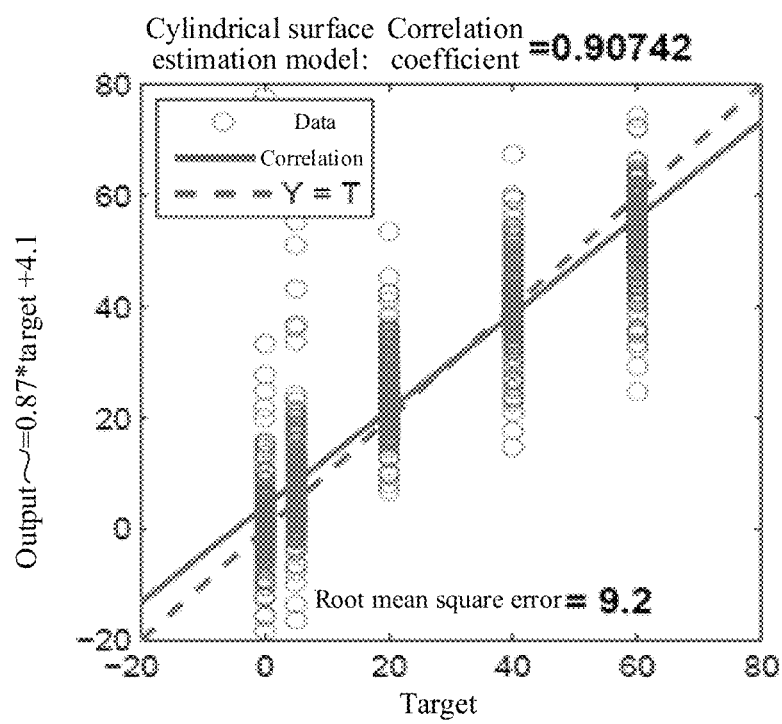
FIG. 31 is a schematic diagram of a training result of a cylindrical surface estimation model according to an exemplary embodiment of this application.

Based on this embodiment of this application, the cylindrical surface estimation model is trained, and a training result is shown in FIG. 31. Based on FIG. 31, it can be seen that a training result of the cylindrical surface estimation model is as follows: After training, a value of a correlation coefficient (R) is approximately 0.9, and a root mean square error (RMSE) is approximately 10 mm. This means that the trained cylindrical surface estimation model is highly related to consistency of the input data.

Figure 32:
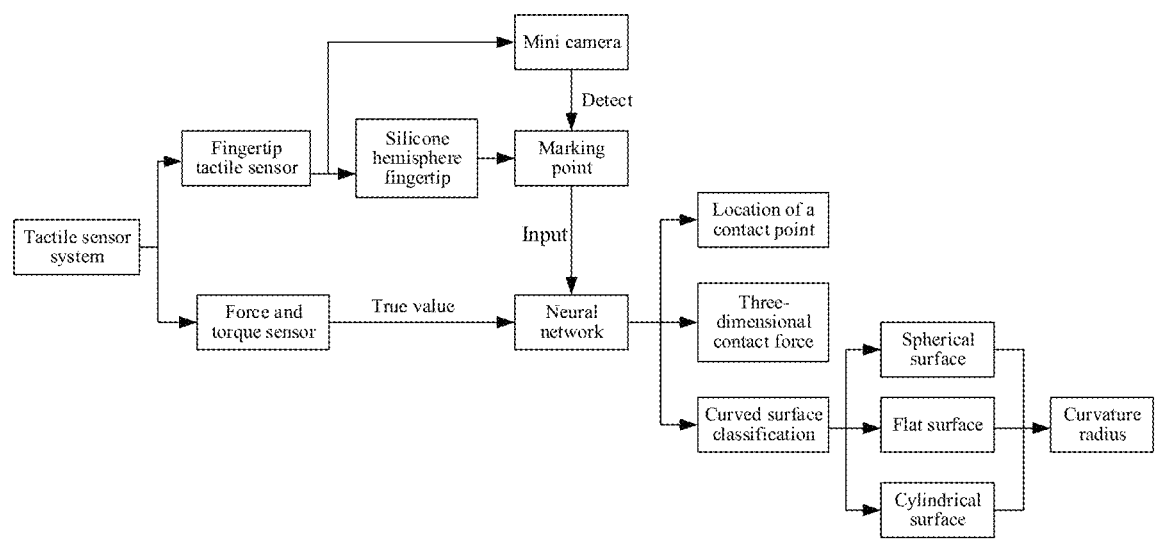
FIG. 32 is a flowchart of a usage method of a tactile sensor system according to an exemplary embodiment of this application.

Based on an embodiment of this application, FIG. 32 is a flowchart of a usage method of the foregoing tactile sensor system 300. A tactile sensor is provided with a sensing face 111, and an inner surface of the sensing face is provided with marking points 112, and an image sensing component 115 is opposite to the inner surface of the sensing face 111. The image sensing component 115 collects displacement of the marking points 112 on an image sequence formed by the inner surface of a flexible sensor 111, and the displacement of the marking points 112 is inputted into the foregoing feedforward neural network as a feature value. A location of a contact point, a magnitude and/or a direction of a three-dimensional contact force, and a local curvature radius of a contact surface are separately measured. In addition, the feedforward neural network may also be trained by comparing a true value of the contact location, a true value of the contact force, and a true value of a local curvature radius of the contact surface that are measured by the torque sensor with values measured by the tactile sensor.

Figure 33:
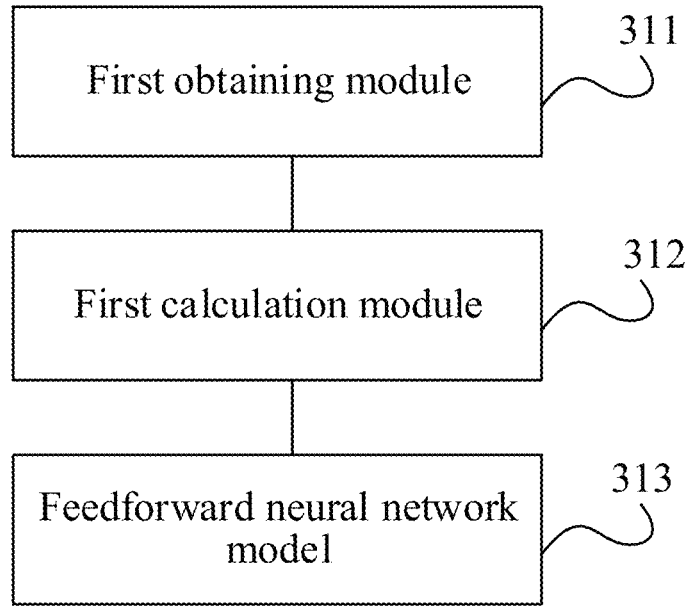
FIG. 33 is a block diagram of a vision-based tactile measurement apparatus according to an exemplary embodiment of this application.

Based on this embodiment of this application, in a schematic structural diagram of the vision-based tactile measurement apparatus, the tactile sensor is connected to the chip. As shown in FIG. 33, the vision-based tactile measurement apparatus includes a first obtaining module 311, a first calculation module 312, and a feedforward neural network 313.

The first obtaining module 311 is configured to obtain an image sequence collected by the image sensing component 115 for the sensing face, an image of the image sequence including the marking pattern.

The first calculation module 312 is configured to calculate a difference feature of the marking patterns based on locations of the marking patterns 112 in adjacent images in the image sequence.

The feedforward neural network 313 is configured to process the difference feature of the marking patterns 112 to obtain a tactile measurement result.

In some embodiments, a hidden layer and an output layer are provided in the feedforward neural network; the hidden layer is configured to perform feature extraction on the difference feature of the marking patterns to obtain a feature representation; and the output layer is configured to process the feature representation to obtain a tactile measurement result. n hidden neurons are provided in the hidden layer, and n is an integer; the hidden layer is constructed based on sigmoid hidden neurons; and the output layer is constructed based on softmax output neurons or linear output neurons.

In some embodiments, the tactile measurement result includes a contact location; and the feedforward neural network includes: a location estimation model, and the location estimation model includes a first hidden layer and a first output layer; and the first hidden layer is configured to perform feature extraction on the difference feature of the marking patterns to obtain a feature representation of the contact location; and the first output layer is configured to process the feature representation of the contact location to obtain the contact location.

In some embodiments, the tactile measurement result includes three-dimensional information of a contact force; and the feedforward neural network includes: a contact force estimation model, and the contact force estimation model includes a second hidden layer and a second output layer; and the second hidden layer is configured to perform feature extraction on the difference feature of the marking patterns to obtain a feature representation of the contact force; and the second output layer is configured to process the feature representation of the contact force to obtain the three-dimensional information of the contact force, the three-dimensional information including at least one of a magnitude and a direction.

In some embodiments, the tactile measurement result includes a local curvature radius of a contact surface; and the feedforward neural network includes: a surface classification model and at least two curvature estimation models; the surface classification model is configured to perform surface recognition on the difference feature of the marking patterns to obtain a surface type of the contact surface; and a target curvature estimation model in the at least two curvature estimation models is configured to perform curvature prediction on the contact surface based on the surface type, to obtain the local curvature radius of the contact surface.

In some embodiments, the curvature estimation model includes: a spherical surface estimation model and a cylindrical surface estimation model; the spherical surface estimation model is configured to: when the surface type is a spherical surface, perform first curvature prediction on the spherical surface, to obtain the local curvature radius of the spherical surface; and the cylindrical surface estimation model is configured to: when the surface type is a cylindrical surface, perform second curvature prediction on the cylindrical surface, to obtain the local curvature radius of the cylindrical surface.

In some embodiments, the surface classification model includes a third hidden layer and a third output layer, the third hidden layer is configured to perform surface recognition on the difference feature of the marking patterns to obtain a feature representation of the surface type; and the third output layer is configured to process the feature representation of the surface type, to obtain the surface type of the contact surface.

In some embodiments, the spherical surface estimation model includes a fourth hidden layer and a fourth output layer, the fourth hidden layer is configured to perform the first curvature prediction on the spherical surface, to obtain a feature representation of the curvature prediction of the spherical surface; and the fourth output layer is configured to process the feature representation of the curvature prediction of the spherical surface, to obtain the local curvature radius of the spherical surface.

In some embodiments, the cylindrical surface estimation model includes a fifth hidden layer and a fifth output layer, the fifth hidden layer is configured to perform the second curvature prediction on the cylindrical surface, to obtain a feature representation of the curvature prediction of the cylindrical surface; and the fifth output layer is configured to process the feature representation of the curvature prediction of the cylindrical surface, to obtain the local curvature radius of the cylindrical surface.

In some embodiments, a first calculation unit is configured to determine two closest marking patterns from adjacent images at an ith frame and an (i+1)th frame in the image sequence as the same marking pattern; and a second calculation unit is configured to calculate a difference feature of the marking patterns based on locations (or locations and deformation) of the marking patterns in the images at the ith frame and the (i+1)th frame.

In some embodiments, the marking pattern includes at least two marking points, and the sample difference feature of the marking patterns includes at least one of displacement and deformation of the marking points.

In some embodiments, the marking pattern includes a grid, and the difference feature of the marking patterns includes at least one of displacement of grid points and deformation of grid lines in the grid.

Figure 34:
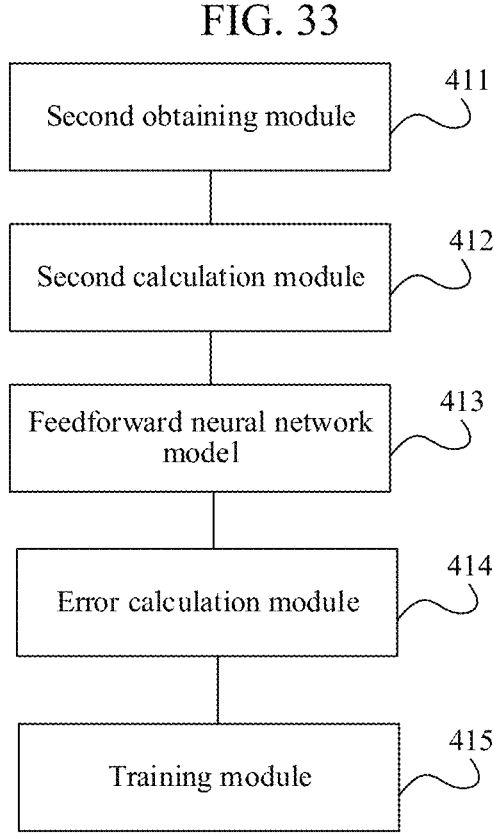
FIG. 34 is a block diagram of an apparatus for training a feedforward neural network according to another exemplary embodiment of this application.

FIG. 34 is a schematic structural diagram of a training module of a vision-based tactile measurement apparatus according to an exemplary embodiment.

Based on this embodiment of this application, as shown in FIG. 26, the training module of the vision-based tactile measurement apparatus includes:

a second obtaining module 411, configured to obtain a training sample, the training sample including a sample image sequence and a sample tactile result, the sample image sequence being an image sequence collected by an image sensing component in a tactile sensor, the tactile sensor including a sensing face and the image sensing component, the sensing face being provided with a marking pattern, and an image of the image sequence including the marking pattern;

a second calculation module 412, configured to calculate a sample difference feature of the marking patterns based on the marking patterns in adjacent images in the sample image sequence;

a feedforward neural network model 413, configured to process the sample difference feature of the marking patterns to obtain a predicted tactile result, a quantity of hidden layers in the feedforward neural network being less than a threshold;

an error calculation module 414, configured to perform error calculation on the predicted tactile result and the sample tactile result to obtain an error loss; and a training module 415, configured to train the feedforward neural network model based on the error loss by using an error backpropagation algorithm to obtain a trained feedforward neural network model.

In some embodiments, a hidden layer and an output layer are provided in the feedforward neural network model; the hidden layer is configured to perform feature extraction on the difference feature of the marking patterns to obtain a feature representation; and the output layer is configured to process the feature representation to obtain a tactile measurement result. n hidden neurons are provided in the hidden layer, and n is an integer; the hidden layer is constructed based on sigmoid hidden neurons; and the output layer is constructed based on softmax output neurons or linear output neurons.

In some embodiments, the feedforward neural network model includes a location estimation model for estimating a contact location, and the second obtaining module 411 is configured to obtain a first training sample, the first training sample including a first sample image sequence and a sample contact location. The estimation model is configured to process the sample difference feature of the marking patterns to obtain a predicted contact location. The error calculation module 414 is further configured to perform error calculation on the predicted contact location and the sample contact location to obtain a first error loss. The training module 415 is further configured to train the location estimation model based on the first error loss by using a Levenberg-Marquardt backpropagation algorithm to obtain a trained location estimation model.

In some embodiments, the feedforward neural network model includes a contact force estimation model for estimating three-dimensional contact force, and the second obtaining module 411 is further configured to obtain a second training sample, the second training sample including a second sample image sequence and three-dimensional information of a sample contact force, the three-dimensional information of the sample contact force being obtained through calibration based on data collected by a torque sensor provided at a rear of the tactile sensor, and the three-dimensional information including a magnitude and/or a direction. The contact force estimation model is configured to process the sample difference feature of the marking patterns to obtain predicted three-dimensional information. The error calculation module 414 is further configured to perform error calculation on the predicted three-dimensional information and the sample three-dimensional information to obtain a second error loss. The training module 415 is further configured to train the contact force estimation model based on the second error loss by using a Levenberg-Marquardt backpropagation algorithm to obtain a trained contact force estimation model.

In some embodiments, the feedforward neural network model includes a surface classification model for classifying contact surfaces, and the second obtaining module 411 is further configured to obtain a third training sample, the third training sample including a third sample image sequence and a type of the sample contact surface. The surface classification model is configured to process the sample difference feature of the marking patterns to obtain a predicted surface type. The error calculation module 414 is further configured to perform error calculation on the predicted surface type and the sample surface type to obtain a third error loss. The training module 415 is further configured to train the surface classification model based on the third error loss by using a backpropagation algorithm of scaled conjugate gradient to obtain a trained surface classification model.

In some embodiments, the feedforward neural network model includes at least two curvature estimation models for estimating curvature, the second obtaining module 411 is configured to obtain a training sample, the training sample including a type of a sample surface and a sample tactile result; and the second calculation module 412 is configured to train the feedforward neural network based on the error loss by using an error backpropagation algorithm to obtain a trained feedforward neural network.

In some embodiments, the curvature estimation model includes: a spherical surface estimation model, and the second obtaining module 411 is configured to obtain a fourth training sample, the fourth training sample including a type of a fourth sample surface and a local curvature radius of a sample spherical surface. The spherical surface estimation model is configured to: when the predicted surface type is the spherical surface, process the sample difference feature of the marking patterns to obtain a predicted curvature radius; The error calculation module 414 is further configured to perform error calculation on the predicted curvature radius of the spherical surface and the local curvature radius of the sample spherical surface to obtain a fourth error loss. The training module 415 is further configured to train the spherical surface estimation model based on the fourth error loss by using a Levenberg-Marquardt backpropagation algorithm to obtain a trained spherical surface estimation model.

In some embodiments, the curvature estimation model includes: a cylindrical surface estimation model, and the second obtaining module 411 is configured to obtain a fifth training sample, the fifth training sample including a type of the fifth sample surface and a local curvature radius of a sample cylindrical surface. The cylindrical surface estimation model is configured to: when the predicted surface type is the cylindrical surface, call the cylindrical surface estimation model to process the difference feature of the marking patterns to obtain a predicted curvature radius. The error calculation module 414 is further configured to perform error calculation on the predicted curvature radius of the cylinder and the local curvature radius of the sample cylindrical surface to obtain a fifth error loss. The training module 415 is further configured to train the cylindrical surface estimation model based on the fifth error loss by using a Levenberg-Marquardt backpropagation algorithm to obtain a trained cylindrical surface estimation model. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

An embodiment of this application further provides a computer device, the computer device includes a memory and a processor, the memory stores a computer-readable instruction, and when executing the computer-readable instruction, the processor implements steps of the method for training the feedforward neural network.

Figure 35:
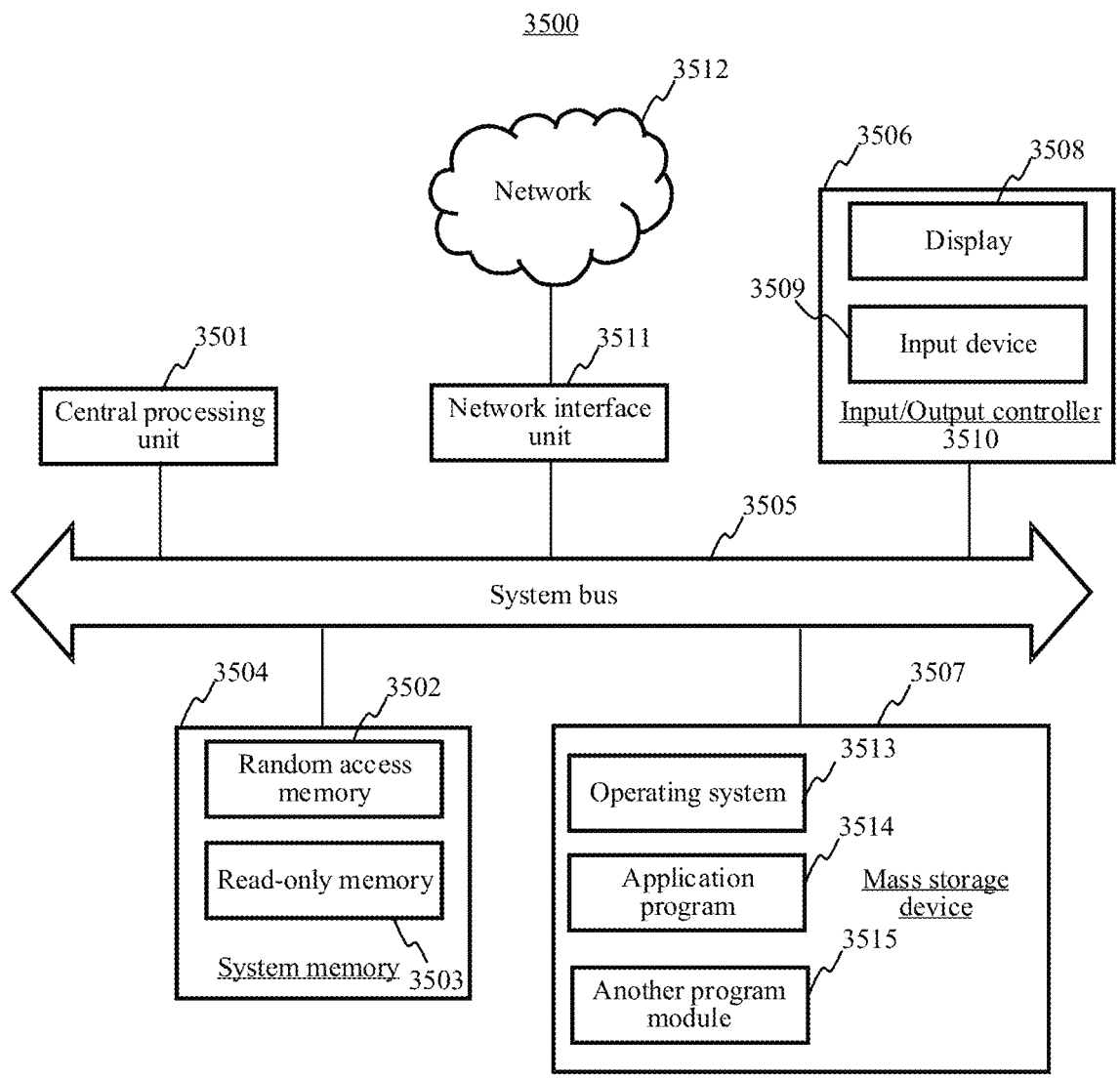
FIG. 35 is a block diagram of a computer device according to an exemplary embodiment of this application.

FIG. 35 is a schematic structural diagram of a computer device according to an exemplary embodiment of this application. The computer device may be configured to perform the method for training the feedforward neural network. Specifically:

The computer device 3500 includes a central processing unit (CPU) 3501, a system memory 3504 including a random access memory (RAM) 3502 and a read-only memory (ROM) 3503, and a system bus 3505 connecting the system memory 3504 and the CPU 3501. The computer device 3500 further includes a basic I/O system 3506 assisting in transmitting information between components in the computer, and a large-capacity storage device 3507 configured to store an operating system 3513, an application program 3514, and another program module 3515.

The basic I/O system 3506 includes a display 3508 configured to display information and an input device 3509 such as a mouse or a keyboard configured to input information by a user. The display 3508 and the input device 3509 are both connected to the CPU 3501 by using an I/O controller 3510 that is connected to the system bus 3505. The basic I/O system 3506 may further include the I/O controller 3510 configured to receive and process input from a plurality of other devices such as a keyboard, a mouse, or an electronic stylus. Similarly, the I/O controller 3510 further provides an output to a display screen, a printer, or another type of output device.

The mass storage device 3507 is connected to the CPU 3501 by using a mass storage controller (not shown) connected to the system bus 3505. The mass storage device 3507 and a computer-readable medium associated therewith provide non-volatile storage to the computer device 3500. That is, the large-capacity storage device 3507 may include the computer-readable medium (not shown) such as a hard disk or a CD-ROM driver.

In general, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, a person skilled in the art can know that the computer storage medium is not limited to the foregoing several types. The system memory 3504 and the mass storage device 3507 may be collectively referred to as a memory.

According to the embodiments of this application, the computer device 3500 may further be connected, through a network such as the Internet, to a remote computer on the network and run. That is, the computer device 3500 may be connected to a network 3512 by using a network interface unit 3511 connected to the system bus 3505, or may be connected to another type of network or a remote computer system (not shown) by using a network interface unit 3511.

The memory further includes one or more programs, which are stored in the memory and are configured to be executed by the CPU.

An embodiment of this application further provides a computer-readable storage medium, storing a computer-readable instruction. When the computer-readable instruction is executed by a processor, the vision-based tactile measurement method or the method for training the feedforward neural network is implemented.

An embodiment of this application further provides a robot system, including: a chip and a tactile sensor, where the tactile sensor is provided in at least one of a fingertip zone and a skin zone, the tactile sensor includes a flexible sensing face and an image sensing component provided toward an inner surface of the flexible sensing face, the flexible sensing face is provided with a marking points, and the image sensing component is connected to the chip, the chip includes at least one of a programmable logic circuit and a program instruction, and when running, the chip is configured to perform the foregoing vision-based tactile measurement method.

An embodiment of this application further provides a flowchart of a usage method of a tactile sensor system 300. As shown in FIG. 32, the method is applicable to the foregoing tactile sensor, the feedforward neural network in the tactile sensor, and the location estimation model, the contact force estimation model, the surface classification model, the spherical surface curvature estimation model, and the cylindrical surface curvature estimation model that are in the foregoing feedforward neural network, the foregoing tactile sensor system, and the foregoing robot system.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A vision-based tactile measurement method performed by a computer device connected to a tactile sensor, the tactile sensor comprising a sensing face and an image sensing component, and the sensing face being provided with a marking pattern; and the method comprising:
   obtaining an image sequence collected by the image sensing component of the sensing face that is in physical contact with a surface of an object, each image of the image sequence comprising one instance of the marking pattern;
   calculating a difference feature of the marking patterns in adjacent images of the image sequence; and
   processing the difference feature of the marking patterns using a feedforward neural network to obtain a tactile measurement result, further comprising:
      calling a hidden layer in the feedforward neural network to perform feature extraction on the difference feature of the marking patterns to obtain a feature representation of the surface of the object, the feature presentation further including a curvature prediction on the surface of the object; and
      calling an output layer in the feedforward neural network to process the feature representation to obtain the tactile measurement result, the tactile measurement result comprising a local curvature radius of the surface of the object.

2. The method according to claim 1, wherein n hidden neurons are provided in the hidden layer, n being an integer;
   the hidden layer is constructed based on hidden neurons of a logistic sigmoid function; and
   the output layer is constructed based on output neurons of a normalized exponential softmax function or linear output neurons.

3. The method according to claim 1, wherein the feedforward neural network comprises: a location estimation model, and the location estimation model comprises a first hidden layer and a first output layer;
   the calling the hidden layer in the feedforward neural network to perform feature extraction on the difference feature of the marking patterns to obtain a feature representation of the surface of the object comprises:
   calling the first hidden layer in the location estimation model to perform feature extraction on the difference feature of the marking patterns to obtain a feature representation of a contact location on the surface of the object; and
   the calling the output layer in the feedforward neural network to process the feature representation to obtain the tactile measurement result comprises:
   calling the first output layer in the location estimation model to process the feature representation of the contact location, to obtain the contact location on the surface of the object.

4. The method according to claim 1, wherein the feedforward neural network comprises: a contact force estimation model, and the contact force estimation model comprises a second hidden layer and a second output layer;
   the calling the hidden layer in the feedforward neural network to perform feature extraction on the difference feature of the marking patterns to obtain a feature representation of the surface of the object comprises:
calling the second hidden layer in the contact force estimation model to perform feature extraction on the difference feature of the marking patterns to obtain a feature representation of the contact force on the surface of the object; and
the calling the output layer in the feedforward neural network to process the feature representation to obtain the tactile measurement result comprises:
calling the second output layer in the contact force estimation model to process the feature representation of the contact force, to obtain three-dimensional information of the contact force on the surface of the object, the three-dimensional information comprising at least one of a magnitude and a direction.

5. The method according to claim 1, wherein the feedforward neural network comprises: a surface classification model and at least two curvature estimation models; and
the processing the difference feature of the marking patterns using a feedforward neural network to obtain a tactile measurement result comprises:
calling the surface classification model to perform surface recognition on the difference feature of the marking patterns to obtain a surface type of the surface of the object; and
calling a target curvature estimation model in the at least two curvature estimation models based on the surface type to perform the curvature prediction on the surface of the object, to obtain the local curvature radius of the surface of the object.

6. The method according to claim 5, wherein the curvature estimation model comprises: a spherical surface estimation model and a cylindrical surface estimation model; and the calling a target curvature estimation model in the at least two curvature estimation models based on the surface type to perform the curvature prediction on the surface of the object, to obtain the local curvature radius of the surface of the object comprises:
in a case that the surface type is a spherical surface, calling the spherical surface estimation model to perform first curvature prediction on the spherical surface, to obtain the local curvature radius of the spherical surface; and
in a case that the surface type is a cylindrical surface, calling the cylindrical surface estimation model to perform second curvature prediction on the cylindrical surface, to obtain the local curvature radius of the cylindrical surface.

7. The method according to claim 5, wherein the surface classification model comprises a third hidden layer and a third output layer; and the calling the surface classification model to perform surface recognition on the difference feature of the marking patterns to obtain a surface type of the surface of the object comprises:
calling the third hidden layer in the surface classification model to perform surface recognition on the difference feature of the marking patterns to obtain a feature representation of the surface type; and
calling the third output layer in the surface classification model to process the feature representation of the surface type, to obtain the surface type of the surface of the object.

8. The method according to claim 6, wherein the spherical surface estimation model comprises a fourth hidden layer and a fourth output layer; and the calling the spherical surface estimation model to perform first curvature prediction on the spherical surface, to obtain the local curvature radius of the spherical surface comprises:
calling the fourth hidden layer in the spherical surface estimation model to perform the first curvature prediction on the spherical surface, to obtain a feature representation of the curvature prediction of the spherical surface; and
calling the fourth output layer in the spherical surface estimation model to process the feature representation of the curvature prediction of the spherical surface, to obtain the local curvature radius of the spherical surface.

9. The method according to claim 6, wherein the cylindrical surface estimation model comprises a fifth hidden layer and a fifth output layer; and the calling the cylindrical surface estimation model to perform second curvature prediction on the cylindrical surface, to obtain the local curvature radius of the cylindrical surface comprises:
calling the fifth hidden layer in the cylindrical surface estimation model to perform the second curvature prediction on the cylindrical surface, to obtain a feature representation of the curvature prediction of the cylindrical surface; and
calling the fifth output layer in the cylindrical surface estimation model to process the feature representation of the curvature prediction of the cylindrical surface, to obtain the local curvature radius of the cylindrical surface.

10. The method according to claim 1, wherein the marking pattern comprises at least two marking points, and the difference feature of the marking patterns comprises at least one of displacement and deformation of the marking points.

11. The method according to claim 1, wherein the marking pattern comprises a grid, and the difference feature of the marking patterns comprises at least one of displacement of grid points and deformation of grid lines in the grid.

12. The method according to claim 1, wherein the calculating a difference feature of the marking patterns based on the marking patterns in adjacent images of the image sequence comprises:
determining two closest marking patterns from adjacent images at an $i^{th}$ frame and an $(i+1)^{th}$ frame in the image sequence as the same marking pattern, i being an integer; and
calculating the difference feature of the marking patterns based on at least one of locations and deformation of the marking patterns in the images at the $i^{th}$ frame and the $(i+1)^{th}$ frame.

13. A computer device in connection with a tactile sensor, the tactile sensor comprising a sensing face and an image sensing component, and the sensing face being provided with a marking pattern, the computer device further comprising a memory and a processor, wherein the memory stores a plurality of computer-readable instructions; and when the processor executes the plurality of computer-readable instructions, causes the computer device to perform a plurality of operations including:
obtaining an image sequence collected by the image sensing component of the sensing face that is in physical contact with a surface of an object, each image of the image sequence comprising one instance of the marking pattern;
calculating a difference feature of the marking patterns in adjacent images of the image sequence; and
processing the difference feature of the marking patterns using a feedforward neural network to obtain a tactile measurement result, further comprising:

calling a hidden layer in the feedforward neural network to perform feature extraction on the difference feature of the marking patterns to obtain a feature representation of the surface of the object, the feature presentation further including a curvature prediction on the surface of the object; and calling an output layer in the feedforward neural network to process the feature representation to obtain the tactile measurement result, the tactile measurement result comprising a local curvature radius of the surface of the object.

14. The computer device according to claim 13, wherein the marking pattern comprises a grid, and the difference feature of the marking patterns comprises at least one of displacement of grid points and deformation of grid lines in the grid.

15. The computer device according to claim 13, wherein the calculating a difference feature of the marking patterns based on the marking patterns in adjacent images of the image sequence comprises:

determining two closest marking patterns from adjacent images at an $i^{th}$ frame and an $(i+1)^{th}$ frame in the image sequence as the same marking pattern, i being an integer; and calculating the difference feature of the marking patterns based on at least one of locations and deformation of the marking patterns in the images at the $i^{th}$ frame and the $(i+1)^{th}$ frame.

16. The computer device according to claim 13, wherein the feedforward neural network comprises: a location estimation model, and the location estimation model comprises a first hidden layer and a first output layer;

the calling the hidden layer in the feedforward neural network to perform feature extraction on the difference feature of the marking patterns to obtain a feature representation of the surface of the object comprises:

calling the first hidden layer in the location estimation model to perform feature extraction on the difference feature of the marking patterns to obtain a feature representation of a contact location on the surface of the object; and the calling the output layer in the feedforward neural network to process the feature representation to obtain the tactile measurement result comprises:

calling the first output layer in the location estimation model to process the feature representation of the contact location, to obtain the contact location on the surface of the object.

17. The computer device according to claim 13, wherein the feedforward neural network comprises: a contact force estimation model, and the contact force estimation model comprises a second hidden layer and a second output layer;

the calling the hidden layer in the feedforward neural network to perform feature extraction on the difference feature of the marking patterns to obtain a feature representation of the surface of the object comprises:

calling the second hidden layer in the contact force estimation model to perform feature extraction on the difference feature of the marking patterns to obtain a feature representation of the contact force on the surface of the object; and the calling the output layer in the feedforward neural network to process the feature representation to obtain the tactile measurement result comprises:

calling the second output layer in the contact force estimation model to process the feature representation of the contact force, to obtain three-dimensional information of the contact force on the surface of the object, the three-dimensional information comprising at least one of a magnitude and a direction.

18. A non-transitory computer-readable storage medium, storing a plurality of computer-readable instructions, wherein the plurality of computer-readable instruction when executed by a processor of a computer device in connection with a tactile sensor, the tactile sensor comprising a sensing face and an image sensing component, and the sensing face being provided with a marking pattern, cause the computer device to perform a plurality of operations including:

obtaining an image sequence collected by the image sensing component of the sensing face that is in physical contact with a surface of an object, each image of the image sequence comprising one instance of the marking pattern;

calculating a difference feature of the marking patterns in adjacent images of the image sequence; and processing the difference feature of the marking patterns using a feedforward neural network to obtain a tactile measurement result, further comprising:

calling a hidden layer in the feedforward neural network to perform feature extraction on the difference feature of the marking patterns to obtain a feature representation of the surface of the object, the feature presentation further including a curvature prediction on the surface of the object; and calling an output layer in the feedforward neural network to process the feature representation to obtain the tactile measurement result, the tactile measurement result comprising a local curvature radius of the surface of the object.

19. The non-transitory computer-readable storage medium according to claim 18, wherein the marking pattern comprises a grid, and the difference feature of the marking patterns comprises at least one of displacement of grid points and deformation of grid lines in the grid.

20. The non-transitory computer-readable storage medium according to claim 18, wherein the calculating a difference feature of the marking patterns based on the marking patterns in adjacent images of the image sequence comprises:

determining two closest marking patterns from adjacent images at an $i^{th}$ frame and an $(i+1)^{th}$ frame in the image sequence as the same marking pattern, i being an integer; and calculating the difference feature of the marking patterns based on at least one of locations and deformation of the marking patterns in the images at the $i^{th}$ frame and the $(i+1)^{th}$ frame.

* * * * *